(12) United States Patent
Ikeda et al.

(10) Patent No.: US 10,730,483 B2
(45) Date of Patent: Aug. 4, 2020

(54) TRANSPARENT WINDOW PLATE PROVIDED WITH DEFOGGING HEAT WIRES

(71) Applicant: DENSO CORPORATION, Kariya, Aichi-pref. (JP)

(72) Inventors: Masakazu Ikeda, Nishio (JP); Hiroaki Kuraoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 294 days.

(21) Appl. No.: 15/580,721

(22) PCT Filed: Jun. 7, 2016

(86) PCT No.: PCT/JP2016/002739
§ 371 (c)(1),
(2) Date: Dec. 8, 2017

(87) PCT Pub. No.: WO2016/203730
PCT Pub. Date: Dec. 22, 2016

(65) Prior Publication Data
US 2018/0186336 A1 Jul. 5, 2018

(30) Foreign Application Priority Data

Jun. 15, 2015 (JP) .................. 2015-120229

(51) Int. Cl.
*B60S 1/02* (2006.01)
*H01Q 1/12* (2006.01)
(Continued)

(52) U.S. Cl.
CPC ........ *B60S 1/026* (2013.01); *B32B 17/10385* (2013.01); *B60J 1/002* (2013.01);
(Continued)

(58) Field of Classification Search
CPC ..................................................... B60S 1/026
(Continued)

(56) References Cited

U.S. PATENT DOCUMENTS 5,867,129 A    2/1999 Sauer
2003/0043082 A1 3/2003 Ro
(Continued)

FOREIGN PATENT DOCUMENTS

JP    2003087028 A    3/2003
JP    2005506904 A    3/2005
(Continued)

*Primary Examiner* — Lori L Baker
(74) *Attorney, Agent, or Firm* — Harness, Dickey & Pierce, P.L.C.

(57) ABSTRACT

A transparent window plate is provided with a plurality of defogging heat wires arranged to have a side parallel with a first direction. The transparent window plate includes: a plurality of repetitive patterns that are arranged between one of the plurality of defogging heat wires and an adjacent one of the plurality of defogging heat wires so as to be not in contact with the plurality of defogging heat wires, and each of the plurality of repetitive patterns having at least one side parallel with the plurality of defogging heat wires. The plurality of repetitive patterns are aligned along the first direction; and the plurality of repetitive patterns are repetitively arranged along a second direction perpendicular to the first direction.

12 Claims, 19 Drawing Sheets

(51) Int. Cl.
    *H01Q 15/00*     (2006.01)
    *E06B 7/28*     (2006.01)
    *B32B 17/10*     (2006.01)
    *B60J 1/00*     (2006.01)
    *H05B 3/84*     (2006.01)

(52) U.S. Cl.
    CPC ............. *E06B 7/28* (2013.01); *H01Q 1/1278* (2013.01); *H01Q 15/0006* (2013.01); *H05B 3/84* (2013.01); *H05B 2203/014* (2013.01)

(58) Field of Classification Search
    USPC .................................................. 219/138–480
    See application file for complete search history.

(56) References Cited

U.S. PATENT DOCUMENTS

2003/0080909 A1     5/2003     Voeltzel
2007/0273597 A1    11/2007     Noda

FOREIGN PATENT DOCUMENTS

JP     2008005474 A     1/2008
JP     2011102218 A     5/2011

WITHOUT DEFOGGING HEAT WIRES

WITH DEFOGGING HEAT WIRES

WITH DEFOGGING HEAT WIRES
AND REPETITIVE PATTERNS

TRANSPARENT WINDOW PLATE PROVIDED WITH DEFOGGING HEAT WIRES

CROSS REFERENCE TO RELATED APPLICATIONS

This application is a U.S. National Phase Application under 35 U.S.C. 371 of International Application No. PCT/JP2016/002739 filed on Jun. 7, 2016 and published in Japanese as WO 2016/203730 A1 on Dec. 22, 2016. This application is based on and claims the benefit of priority from Japanese Patent Application No. 2015-120229 filed on Jun. 15, 2015. The entire disclosures of all of the above applications are incorporated herein by reference.

TECHNICAL FIELD

The present disclosure relates to a transparent window plate provided with defogging heat wires.

BACKGROUND ART

A heat-reflecting glass plate has been conventionally used for, for example, an automotive windshield. Such a heat-reflecting glass plate includes a heat-reflecting layer made of a material such as metal and a metallic oxide to reflect infrared rays and admit visible rays having wavelengths shorter than those of the infrared rays. This maintains visibility and inhibits the entry of solar heat into the vehicle cabin. The heat-reflecting layer blocks not only infrared rays but also electromagnetic waves having wavelengths longer than those of the infrared rays. Such a property of the heat-reflecting layer prohibits an antenna located in the cabin from receiving radio waves from outside the cabin and radiating radio waves to the outside of the cabin appropriately. As a solution, a type of heat-reflecting glass plate that has a mesh pattern or a slit pattern has been provided. This type of heat-reflecting glass plate works as a frequency selective surface (FSS), which allows electromagnetic waves in a specific frequency band to pass therethrough (Patent Literatures 1 and 2).

A glass plate for use in, for example, an automotive rear window is provided with defogging heat wires that are placed horizontally. Such defogging heat wires also have the property of blocking electromagnetic waves. A mesh pattern or a slit pattern, if formed on such a glass plate, impairs the defogging function of the defogging heat wires and thus should not be formed on the glass plate for a rear window. Hence, the glass plate does not work as a frequency selective surface, prohibiting the antenna located in the cabin from receiving radio waves from behind the vehicle and radiating radio waves rearward of the vehicle appropriately.

PRIOR ART LITERATURES

Patent Literature

Patent Literature 1: JP 2011-102218 A
Patent Literature 2: JP 2005-506904 A

SUMMARY OF INVENTION

An object of the present disclosure is to provide a transparent window plate provided with defogging heat wires that enables an antenna located in a cabin to receive radio waves from outside the cabin and radiate radio waves to the outside of the cabin appropriately without impairing the defogging function of the defogging heat wires.

According to a first aspect of the present disclosure, a transparent window plate is provided with a plurality of defogging heat wires, and each of the plurality of defogging heat wires is arranged to have a side parallel with a first direction. The transparent window plate includes: a plurality of repetitive patterns that are arranged between one of the plurality of defogging heat wires and an adjacent one of the plurality of defogging heat wires so as to be not in contact with the plurality of defogging heat wires, and each of the plurality of repetitive patterns having at least one side parallel with the plurality of defogging heat wires. The plurality of repetitive patterns are aligned along the first direction; and the plurality of repetitive patterns are repetitively arranged along a second direction perpendicular to the first direction.

Addition of the repetitive patterns between the defogging heat wires as described above enables a transparent plate including the defogging heat wires and the repetitive patterns to work as a BPF (band pass filter). As a result, a transmission characteristic gain can be increased in a frequency band in which, with the placement of only the defogging heat wires, the transmission characteristic gain is inhibited. The repetitive patterns are arranged so as to be away from the defogging heat wires and thus do not impair the defogging function of the defogging heat wires. Accordingly, an antenna located in a cabin is enabled to receive radio waves from outside the cabin and radiate radio waves to the outside of the cabin appropriately without impairing the defogging function.

According to a second aspect of the present disclosure, a transparent window plate is provided with a plurality of defogging heat wires, and each of the plurality of defogging heat wires is arranged to have a side parallel with a first direction. The transparent window plate includes a plurality of repetitive patterns arranged on a surface, which is different from a surface on which the defogging heat wires are arranged, each of the plurality of repetitive patterns having at least one side parallel with a second predefined direction, which is perpendicular to the first direction, the each of the plurality of repetitive patterns having a dimension in the first direction identical to a gap between one of the plurality of defogging heat wires and an adjacent one of the plurality of defogging heat wires. The plurality of repetitive patterns are arranged repetitively in the first direction.

Addition of the repetitive patterns on a surface different from a surface on which the defogging heat wires are arranged as described above enables a transparent plate including the defogging heat wires and the repetitive patterns to work as a BPF. As a result, a transmission characteristic gain can be increased in a frequency band in which, with the placement of only the defogging heat wires, the transmission characteristic gain is inhibited. The placement of the repetitive patterns on a surface different from a surface on which the defogging heat wires are arranged prohibits the repetitive patterns from coming into contact with the defogging heat wires and thereby prevents impairment of the defogging function of the defogging heat wires, as in the case of the transparent window plate provided with defogging heat wires according to a first aspect of the present disclosure. Accordingly, an antenna located in a cabin is enabled to receive radio waves from outside the cabin and radiate radio waves to the outside of the cabin appropriately without impairing the defogging function.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
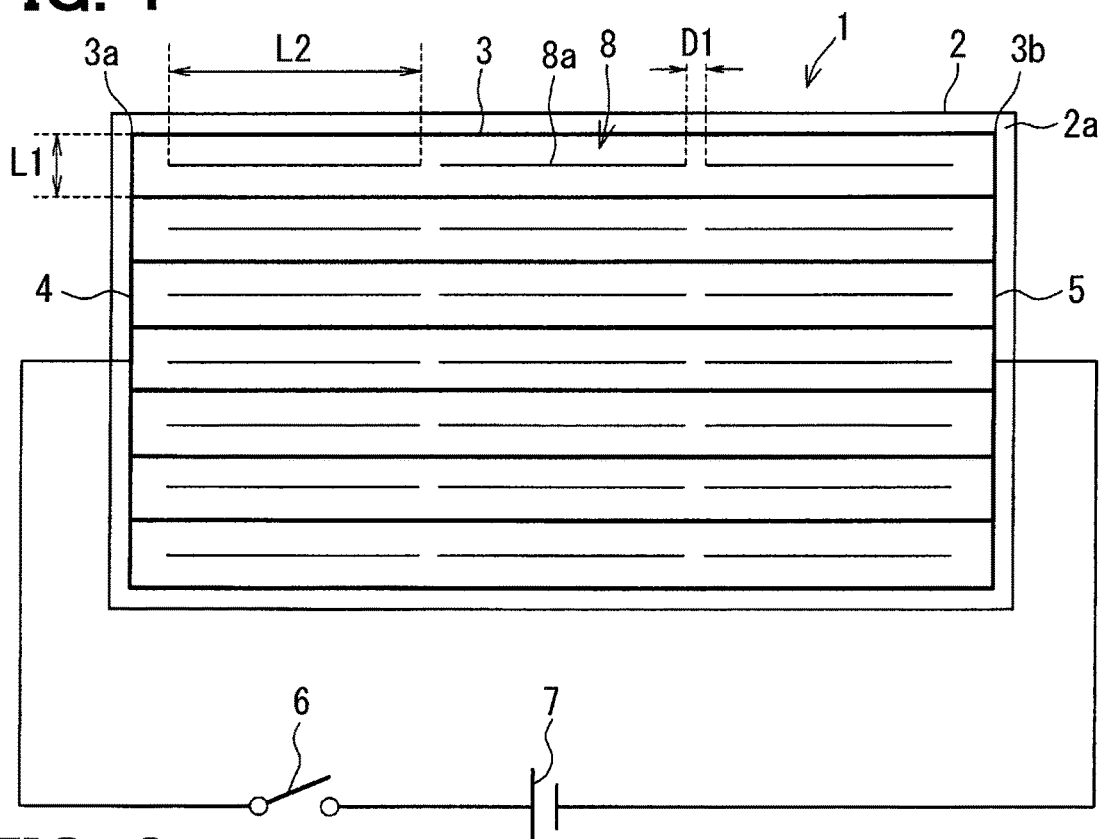
FIG. 1 is a diagram of a first embodiment of the present disclosure, illustrating defogging heat wires and repetitive patterns.

A first embodiment will now be described with reference to FIGS. 1 to 15. A transparent window plate provided with defogging heat wires according to the first embodiment of the present disclosure is used in an automotive rear window. As illustrated in FIG. 1, a transparent window plate provided with defogging heat wires (hereinafter referred to as a transparent plate) 1 includes a substrate 2, which is made using transparent glass and has a plate-like shape. The substrate 2 has surfaces one of which is a front surface 2a. Defogging heat wires 3 (eight in FIG. 1) are arranged throughout the front surface 2a thereon in such a manner that lines of the defogging heat wires 3 are parallel with each other in a horizontal direction (that is, in a vehicle width direction, and it corresponds to a first predefined direction). That the defogging heat wires 3 are parallel with each other means that they are parallel for their entire lengths from one ends 3a of the defogging heat wires 3 (left ends in FIG. 1) to the other ends 3b (right ends in FIG. 1) thereof or that they are parallel by at least parts of their lengths. The one ends 3a of the defogging heat wires 3 are connected to a bus bar 4 electrically, and the other ends 3b are connected to a bus bar 5 electrically. The defogging heat wires 3 and the bus bars 4 and 5 are formed by, for example, vapor deposition of conductive metal, such as silver, on the front surface 2a of the substrate 2. The bus bar 4 is connected via a switch 6 to a positive electrode of a vehicle battery 7, and the bus bar 5 is connected to a negative electrode of the vehicle battery 7. The switch 6 is arranged in, for example, an instrument panel in a position easily operable by an occupant of the vehicle, such as a driver. A voltage conversion circuit (not shown) is arranged between the bus bar 4 and the vehicle battery 7, and a voltage conversion circuit (not shown) is also arranged between the bus bar 5 and the vehicle battery 7.

In such a configuration, when an occupant turns on the switch 6, a positive voltage from the vehicle battery 7 is converted by a corresponding one of the voltage conversion circuits to a predefined voltage, which in turn is applied to the bus bar 4, and a negative voltage is converted by the other one of the voltage conversion circuits to a predefined voltage, which in turn is applied to the bus bar 5. As a result, a current flows through the defogging heat wires 3 from the respective one ends 3a to the respective other ends 3b, allowing the defogging heat wires 3 to heat up to perform the defogging function and thereby maintain the visibility. A gap (marked with L1 in FIG. 1) between the defogging heat wires 3 is defined in such a manner that, for example, the amount of heat generated by the entire defogging heat wires 3 satisfies a reference range specified in advance. The gap is defined also by combining various conditions, such as the number of the defogging heat wires 3, a current value allowed to flow through each of the defogging heat wires 3, and a resistance value of each of the defogging heat wires 3. In the present embodiment, the gap between the defogging heat wires 3 is, for example, 25 [mm].

A repetitive pattern 8 is arranged between the defogging heat wires 3 so as to be away from the defogging heat wires 3 (that is, so as to maintain insulation). A plurality of repetitive patterns 8 that line up horizontally (three in FIG. 1) is arranged between the defogging heat wires 3 and is repeated (seven in FIG. 1) in a vertical direction (that is, in a vehicle height direction, and it corresponds to a second predefined direction). Each of the repetitive patterns 8 includes one unit pattern 8a. The unit pattern 8a has a linear shape having a side parallel with the defogging heat wires 3. A horizontal dimension of the unit pattern 8a (marked with L2 in FIG. 1) has a value substantially equal to a value obtained by multiplying a wavelength of a predefined resonance frequency fr, which will be described hereinafter, by (½). Horizontal gaps between the repetitive patterns 8 are identical (marked with D1 in FIG. 1). As in the case with the defogging heat wires 3, each of the repetitive patterns 8 are formed by, for example, vapor deposition of conductive metal, such as silver, on the front surface 2a of the substrate 2.

Figure 2:
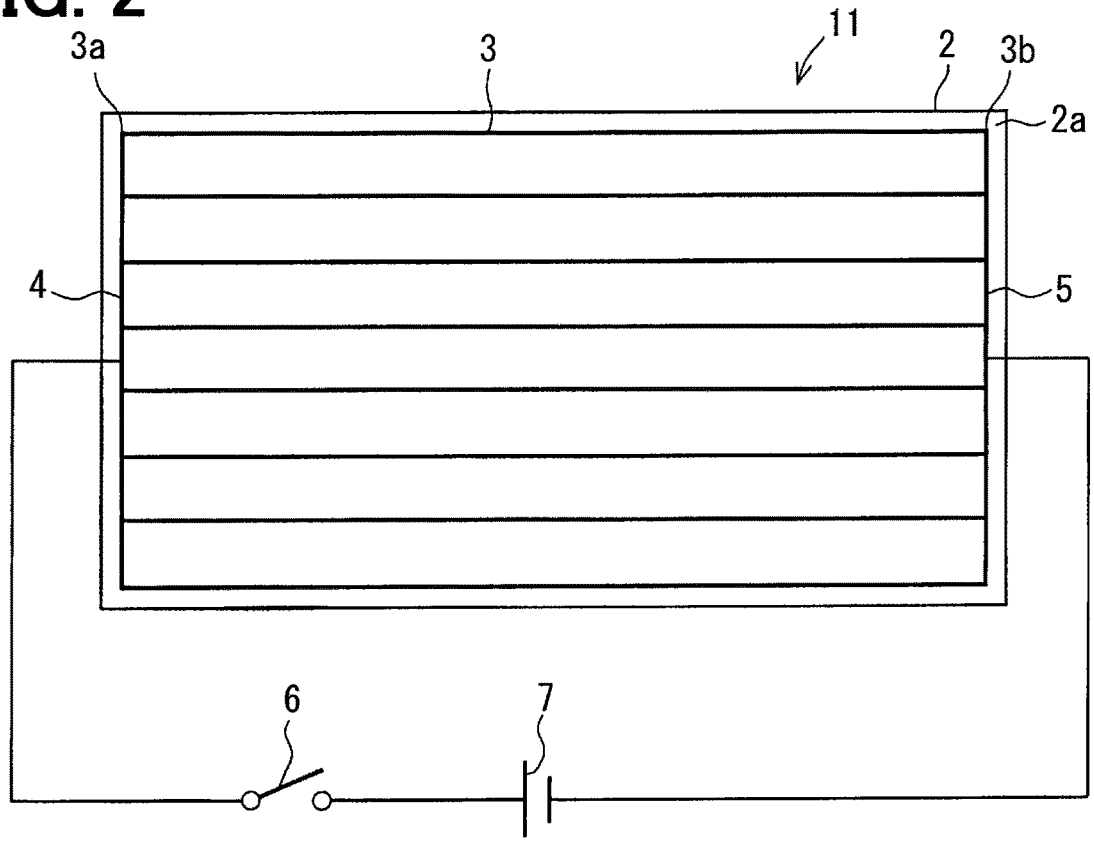
FIG. 2 is a diagram of a comparative configuration.
Figure 3:
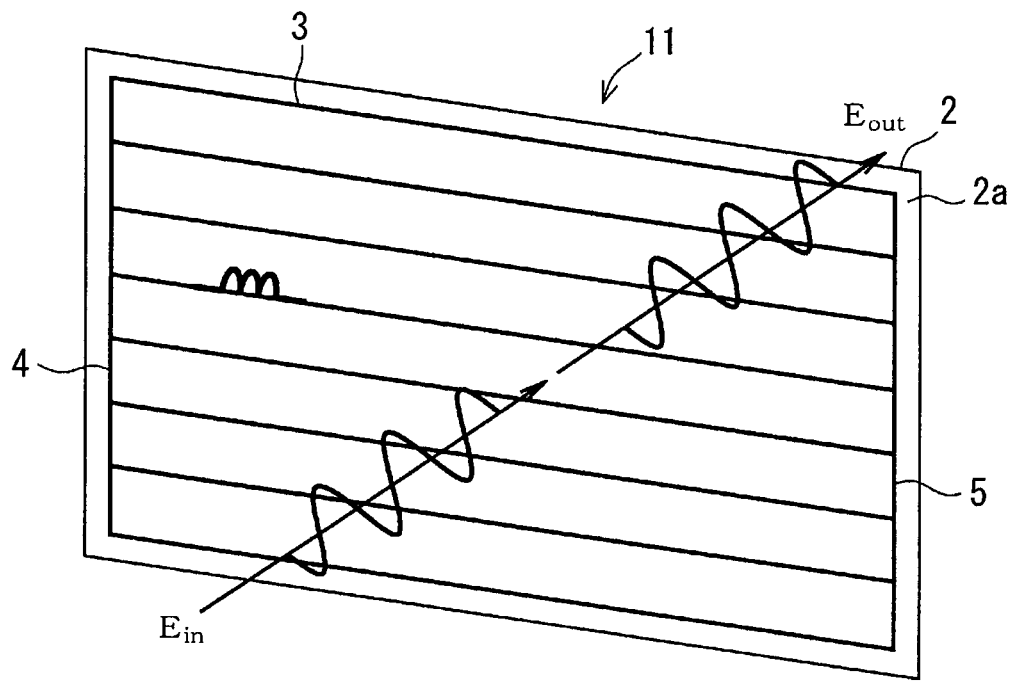
FIG. 3 is a diagram of a radio wave transmission characteristic analytical model of the comparative configuration.
Figure 4:
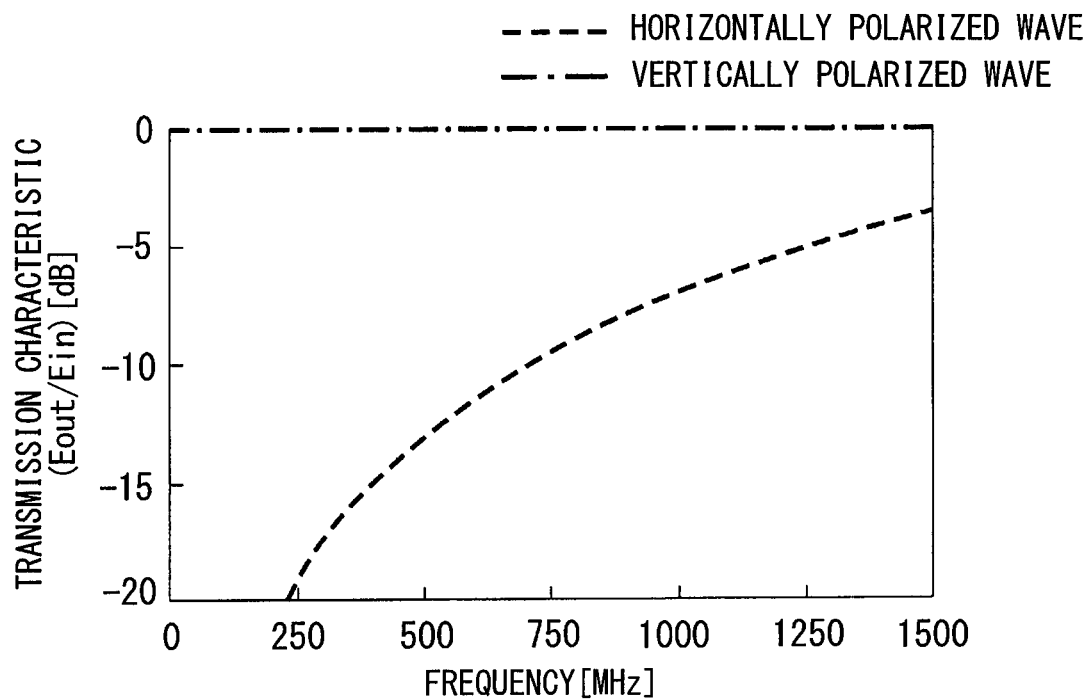
FIG. 4 is a diagram of a transmission characteristic of the comparative configuration.

Electrical characteristics of the configuration described above will now be described. Electrical characteristics of a comparative configuration will be described first for comparison with those of the present configuration. As illustrated in FIG. 2, a comparative transparent plate 11 lacks the repetitive patterns 8 of the transparent plate 1 described above. The transparent plate 11 is provided with defogging heat wires 3 that are arranged horizontally; thus, as illustrated in FIGS. 3 and 4, the transparent plate 11 admits a vertically polarized wave but blocks a lower frequency band of a horizontally polarized wave because it works as an HPF due to its frequency selective surface. For example, the horizontally polarized wave has a transmission loss of approximately 10 [dB] in frequencies in the vicinity of 750 [MHz], which is used for telephone communication.

Figure 5:
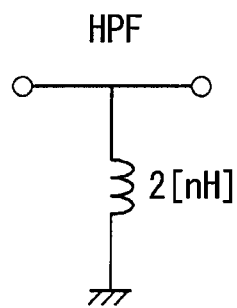
FIG. 5 is a diagram of an equivalent circuit of the comparative configuration.
Figure 6:
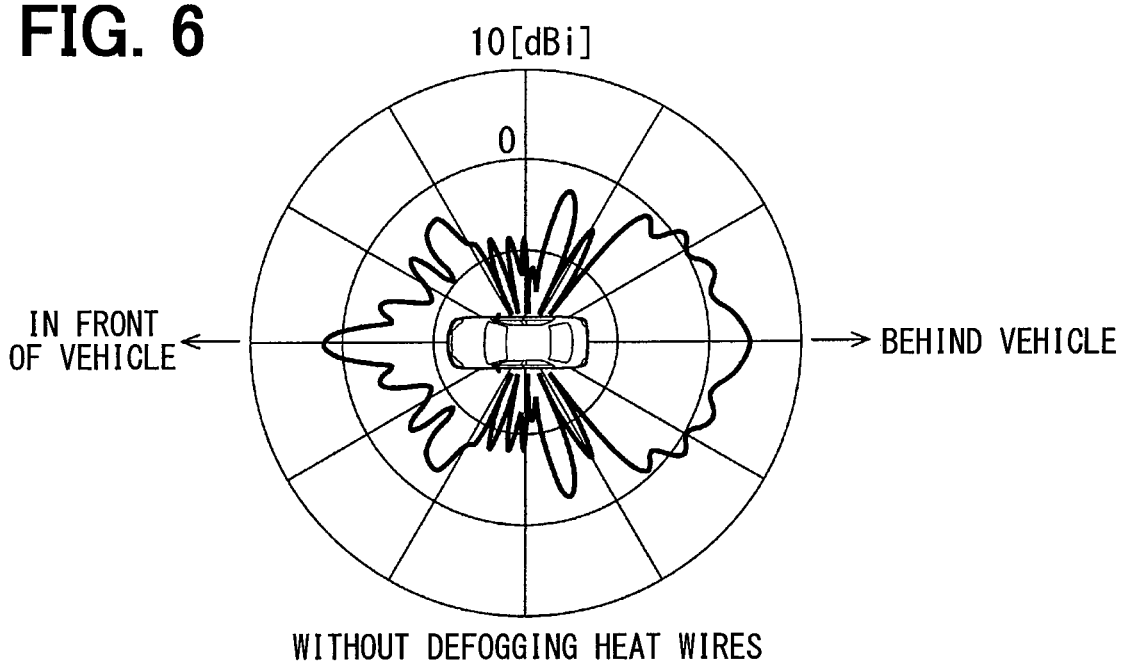
FIG. 6 is a diagram of the directivity of a horizontally polarized wave in a horizontal plane in a configuration having no defogging heat wires.
Figure 7:
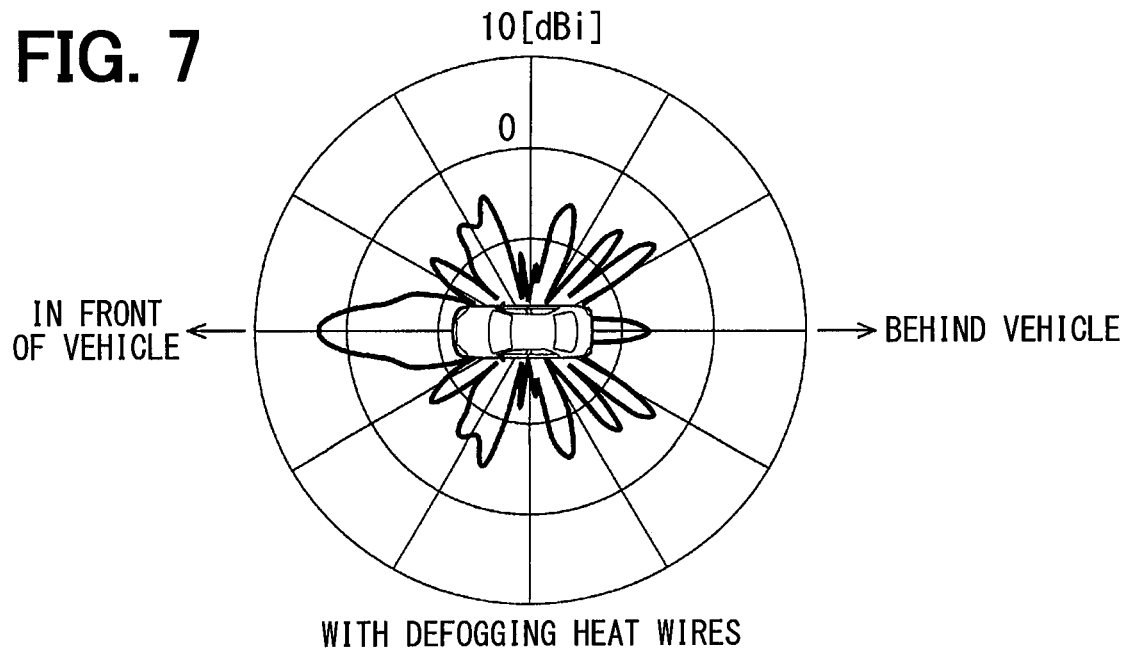
FIG. 7 is a diagram of the directivity of a horizontally polarized wave in the horizontal plane in a comparative configuration.

In this case, as illustrated in FIG. 5, an inductive component of the HPF calculated from the transmission characteristic illustrated in FIG. 4 is approximately 2 [nH]. In FIGS. 6 and 7, the directivity of a horizontally polarized wave in a horizontal plane is illustrated with a horizontally polarized wave antenna having an operating frequency of 750 [MHz] located in a position on a rear roof near the rear window. The directivity of a horizontally polarized wave in a configuration having no defogging heat wires 3 is illustrated in FIG. 6, and the directivity of a horizontally polarized wave in a configuration having the defogging heat wires 3 (i.e., the comparative configuration) is illustrated in FIG. 7. The figures demonstrate that a gain behind a vehicle having the configuration including the defogging heat wires 3 is lower by approximately 10 [dB] than that of the configuration with no defogging heat wires 3, indicating an agreement with the transmission loss in the transmission characteristic illustrated in FIG. 4. Since the gain behind the vehicle is reduced with the operating frequency of 750 [MHz] in the comparative configuration as described above, a horizontally polarized wave antenna having the operating frequency of 750 [MHz] located in the cabin may be prohibited from receiving radio waves from outside the cabin and radiating radio waves to the outside of the cabin appropriately.

In contrast, the transparent plate 1 according to the present embodiment includes the repetitive patterns 8 between the defogging heat wires 3. It is known that a transparent plate simply including repetitive patterns 8 that line up in the horizontal direction and are arranged repetitively in the vertical direction works as a BEF due to its frequency selective surface.

Figure 8:
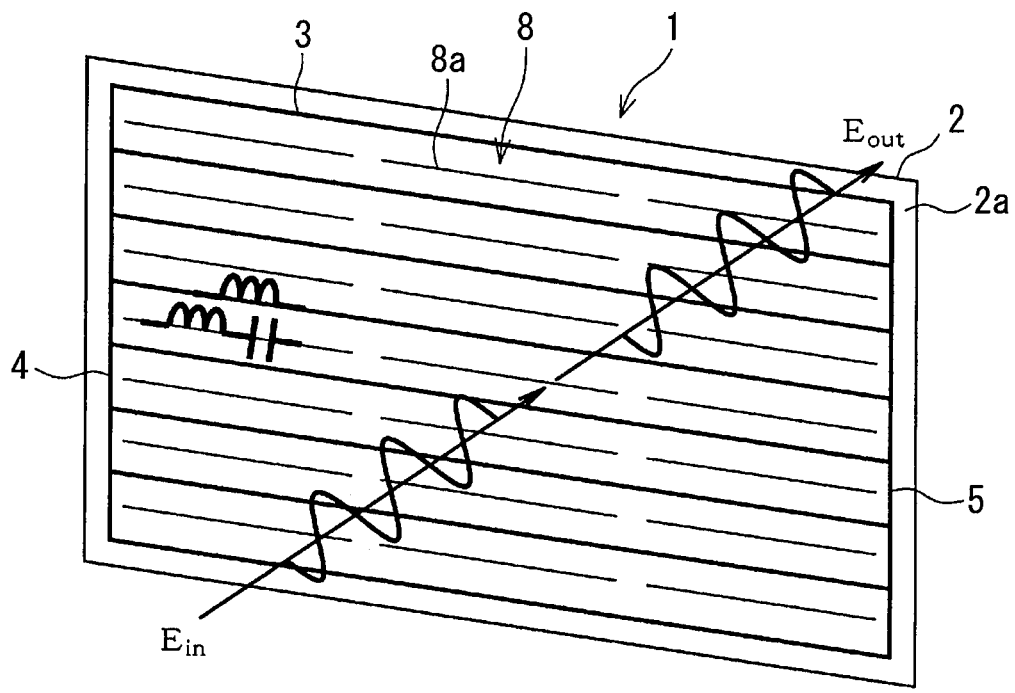
FIG. 8 is a diagram of a radio wave transmission characteristic analytical model.
Figure 9:
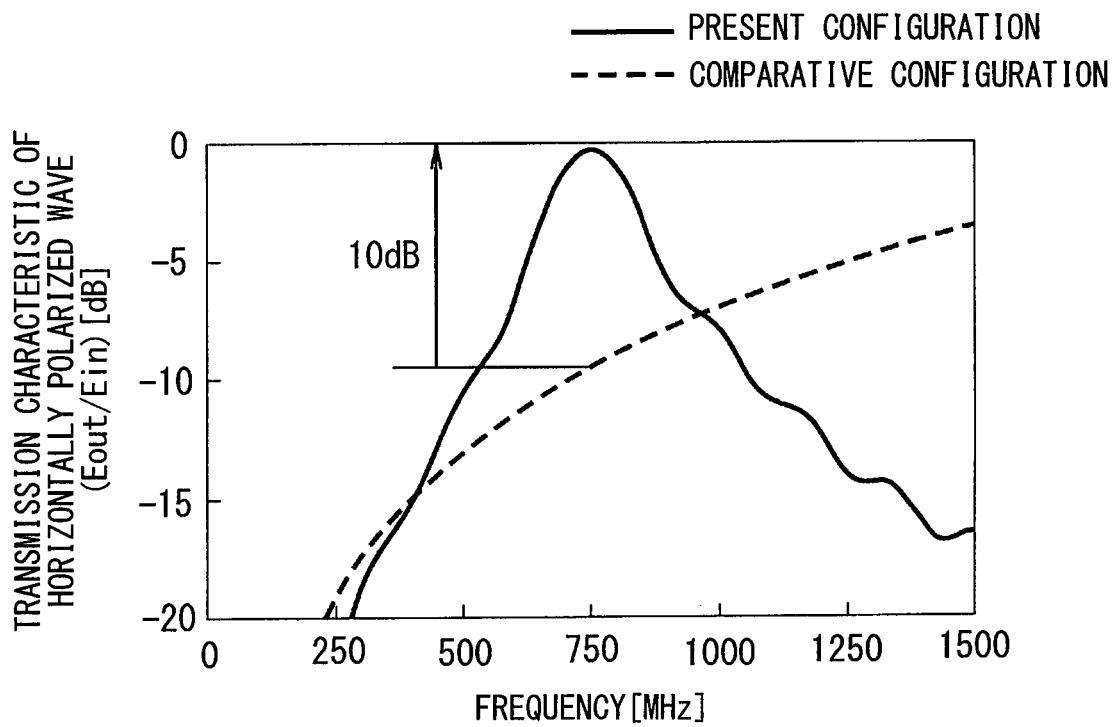
FIG. 9 is a diagram of a transmission characteristic of a horizontally polarized wave.
Figure 10:
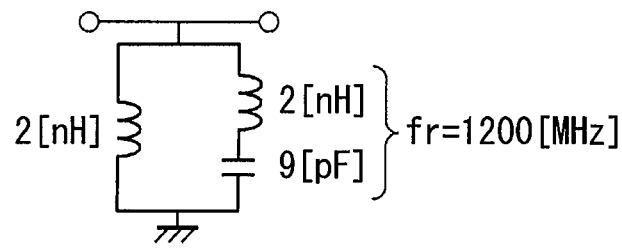
FIG. 10 is a diagram of an equivalent circuit.
Figure 11:
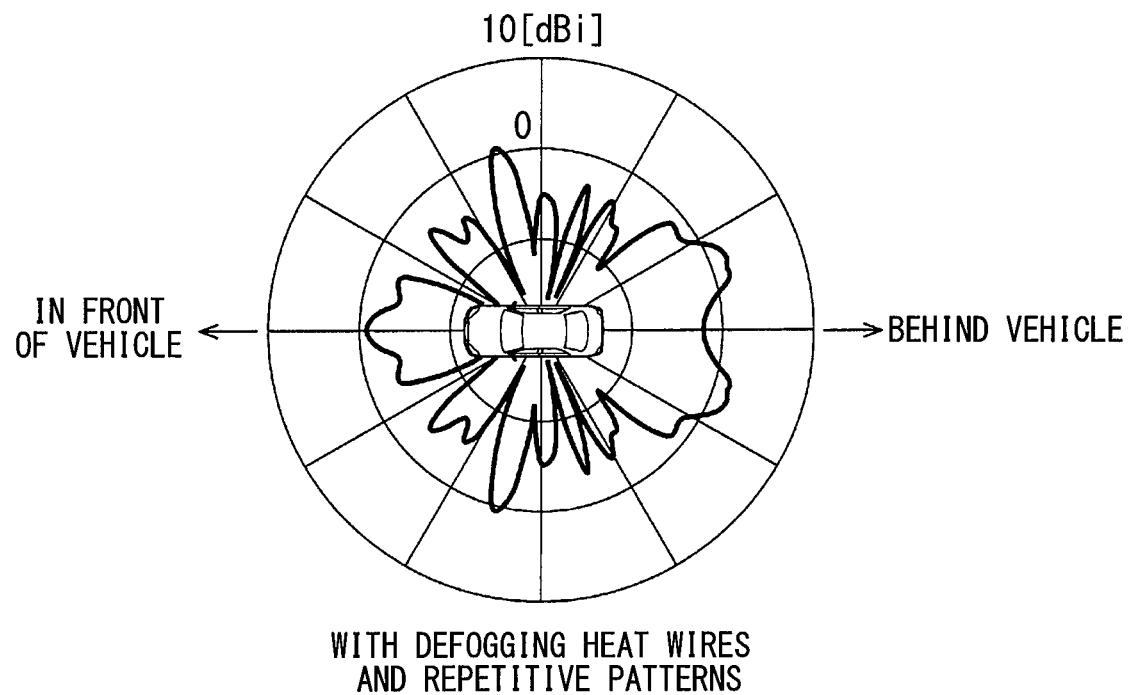
FIG. 11 is a diagram of the directivity of a horizontally polarized wave in the horizontal plane.

It is difficult to configure a pattern that forms a capacitive component connected in parallel with the inductive component of the defogging heat wires 3; thus, in the present embodiment, a series resonant circuit having a resonance frequency fr of 1200 [MHz], which is higher than the operating frequency of 750 [MHz], is formed so as to work as the capacitive component at 750 [MHz], which is lower than the resonance frequency fr, as illustrated in FIG. 8. That is, the electrical connection between the defogging heat wires 3 and the repetitive patterns 8 is equated with a parallel connection between the inductive component and the capacitive component, and thereby the transparent plate 1 works as a BPF due to its frequency selective surface as illustrated in FIG. 9. In this case, as illustrated in FIG. 10, an inductive component of the series resonant circuit calculated from the transmission characteristic illustrated in FIG. 9 is 2 [nH], and the capacitive component is 9 [pF]. In FIG. 11, the directivity of a horizontally polarized wave in the present configuration is illustrated with the horizontally polarized wave antenna located in the position on the rear roof near the rear window as in FIGS. 6 and 7 described above. The figure demonstrates that a gain behind a vehicle having the configuration including the repetitive patterns 8 added between the defogging heat wires 3 is increased by approximately 10 [dB] in comparison with a gain of the configuration including no repetitive patterns 8 (i.e., the comparative configuration), indicating an agreement with the transmission characteristic illustrated in FIG. 9.

Figure 12:
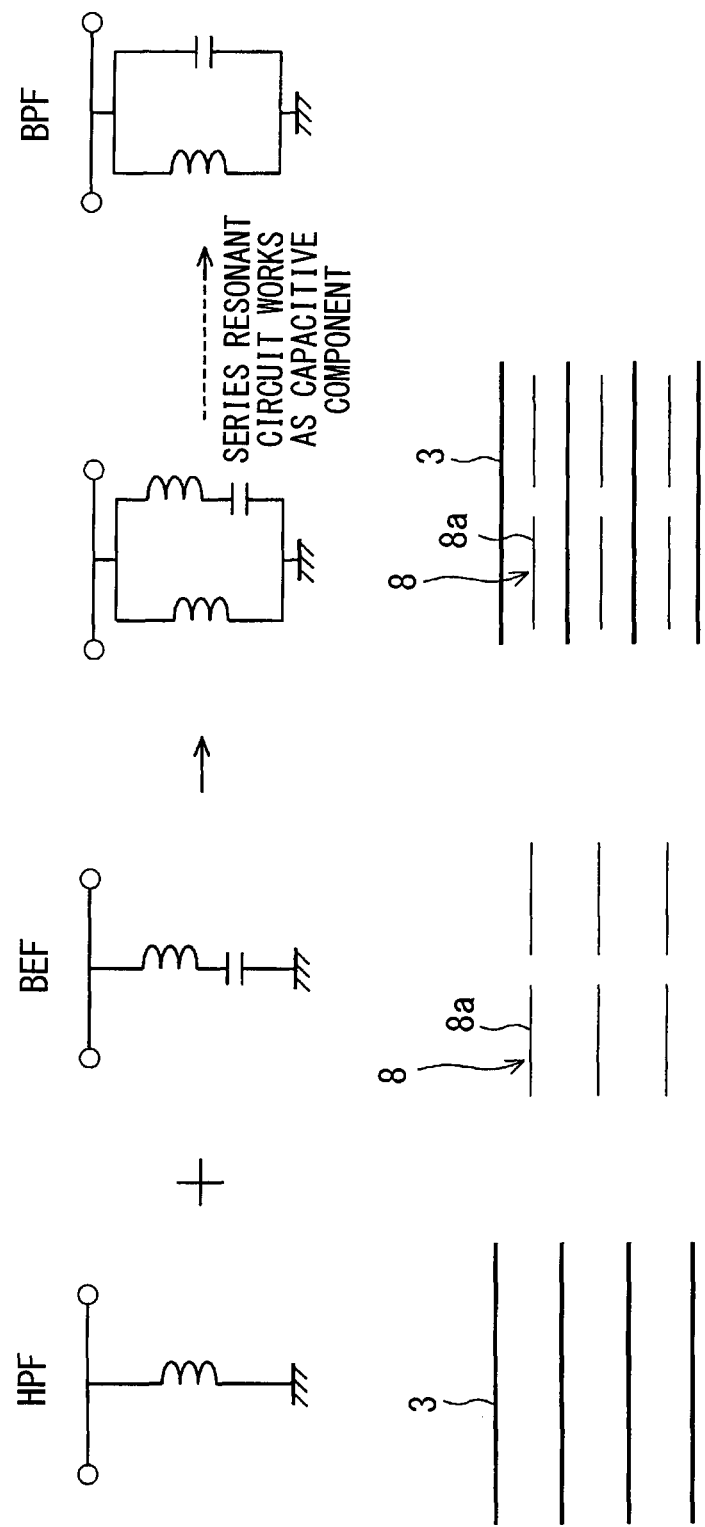
FIG. 12 is a diagram of a relationship of equivalent circuits.

Since the gain behind the vehicle is increased at the operating frequency of 750 [MHz] in the present embodiment as described above, a horizontally polarized wave antenna having the operating frequency of 750 [MHz] located in a cabin is enabled to receive radio waves from outside the cabin and radiate radio waves to the outside of the cabin appropriately. That is, as illustrated in FIG. 12, the present embodiment combines the defogging heat wires 3, which work as an HPF alone, and the repetitive patterns 8, which work as a BEF alone, to form a metamaterial configuration, enabling the metamaterial configuration to work as a BPF and thereby improving the transmission characteristic of a horizontally polarized wave.

Figure 13:
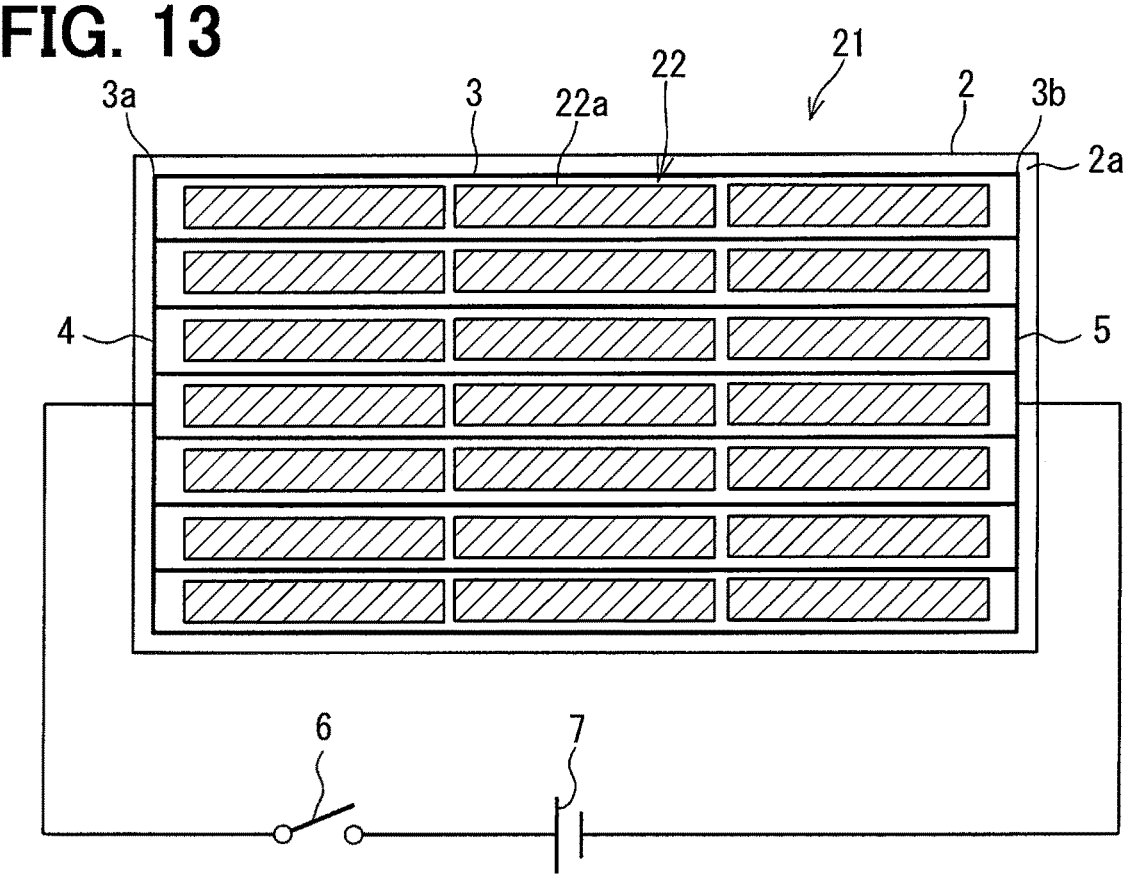
FIG. 13 is a diagram of the defogging heat wires and other repetitive patterns.
Figure 14:
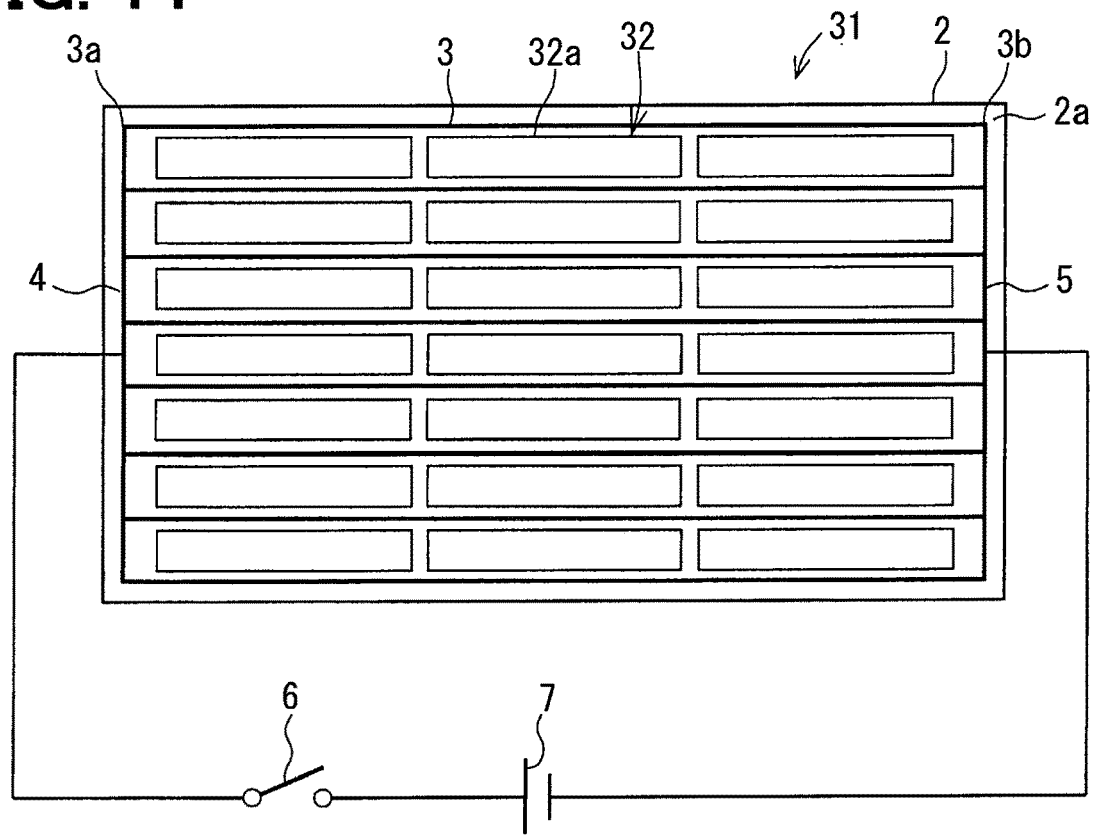
FIG. 14 is a diagram of the defogging heat wires and other repetitive patterns.
Figure 15:
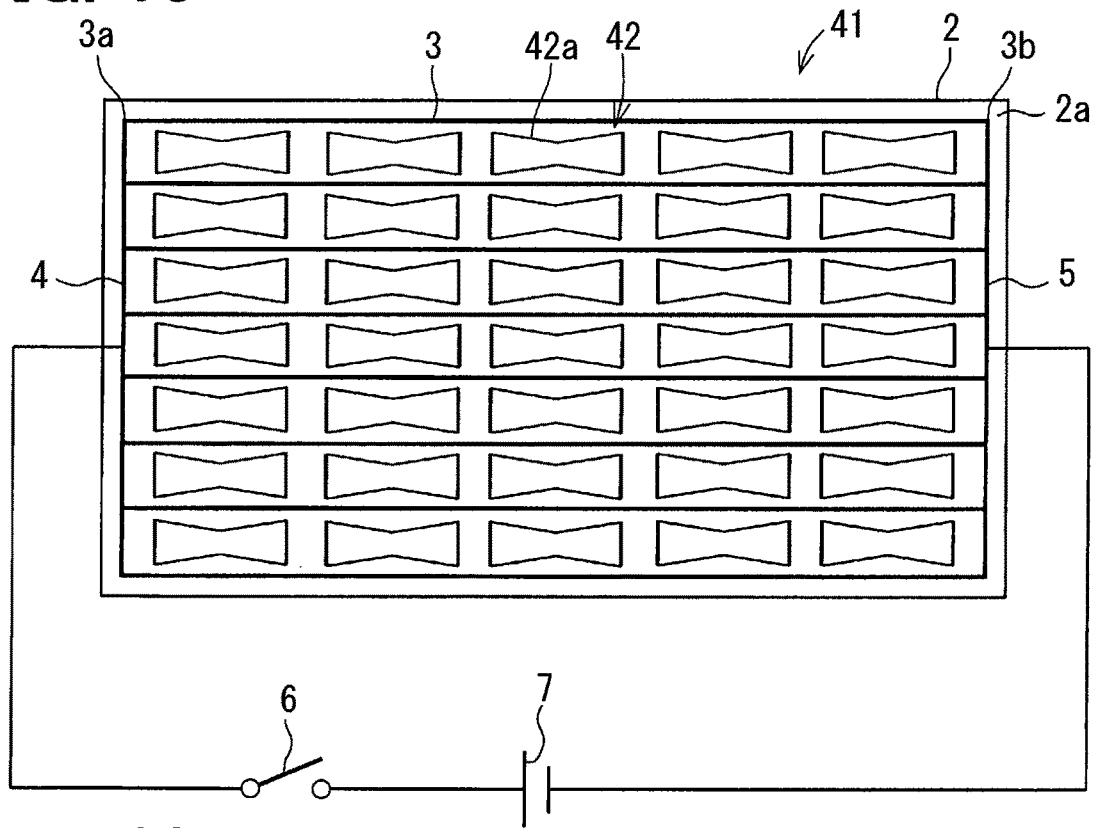
FIG. 15 is a diagram of the defogging heat wires and other repetitive patterns.

The shape of the unit pattern that configures the repetitive pattern is not limited to the linear shape described above as an example and may be any other shape. As illustrated in FIG. 13, a repetitive pattern 22 may include a unit pattern 22a having a rectangular planar shape (indicated as a hatched area in FIG. 13) on a transparent plate 21. Alternatively, as illustrated in FIG. 14, a repetitive pattern 32 may include a unit pattern 32a having a loop shape on a transparent plate 31. Alternatively, as illustrated in FIG. 15, a repetitive pattern 42 may include a unit pattern 42a having a rectangular loop shape having six sides on a transparent plate 41. Note that, while the configurations including a unit pattern having a planar shape or a loop shape have vertical sides, the presence of such a vertical side has no effect on the transmission characteristic of a horizontally polarized wave in most cases. When the unit pattern has a planar shape or a loop shape, the repetitive patterns 22, 32, and 42 are desirably made using a transparent or translucent material to maintain the visibility.

As described above, the first embodiment can produce operational advantages described below. The transparent plate 1 including the defogging heat wires 3 includes the repetitive patterns 8 between the defogging heat wires 3. The electrical connection between the defogging heat wires 3 and the repetitive patterns 8 is equated with a parallel connection between an inductive component and a capacitive component, and thereby the transparent plate 1 works as a BPF due to its frequency selective surface. A transmission characteristic gain can be increased in a frequency band in which, with the placement of only the defogging heat wires 3, the transmission characteristic gain is inhibited. Additionally, the repetitive patterns 8 are arranged so as to be away from the defogging heat wires 3 and thus do not impair the defogging function of the defogging heat wires 3. Accordingly, a horizontally polarized wave antenna located in a cabin is enabled to receive radio waves from outside the cabin and radiate radio waves to the outside of the cabin appropriately without impairing the defogging function.

Second Embodiment

A second embodiment of the present disclosure will now be described with reference to FIGS. 16 to 19. The description of components identical with those in the first embodiment described above will be omitted, and different components will be described. While the repetitive pattern 8 includes one unit pattern 8a in the first embodiment, a repetitive pattern includes a plurality of unit patterns in the second embodiment.

Figure 16:
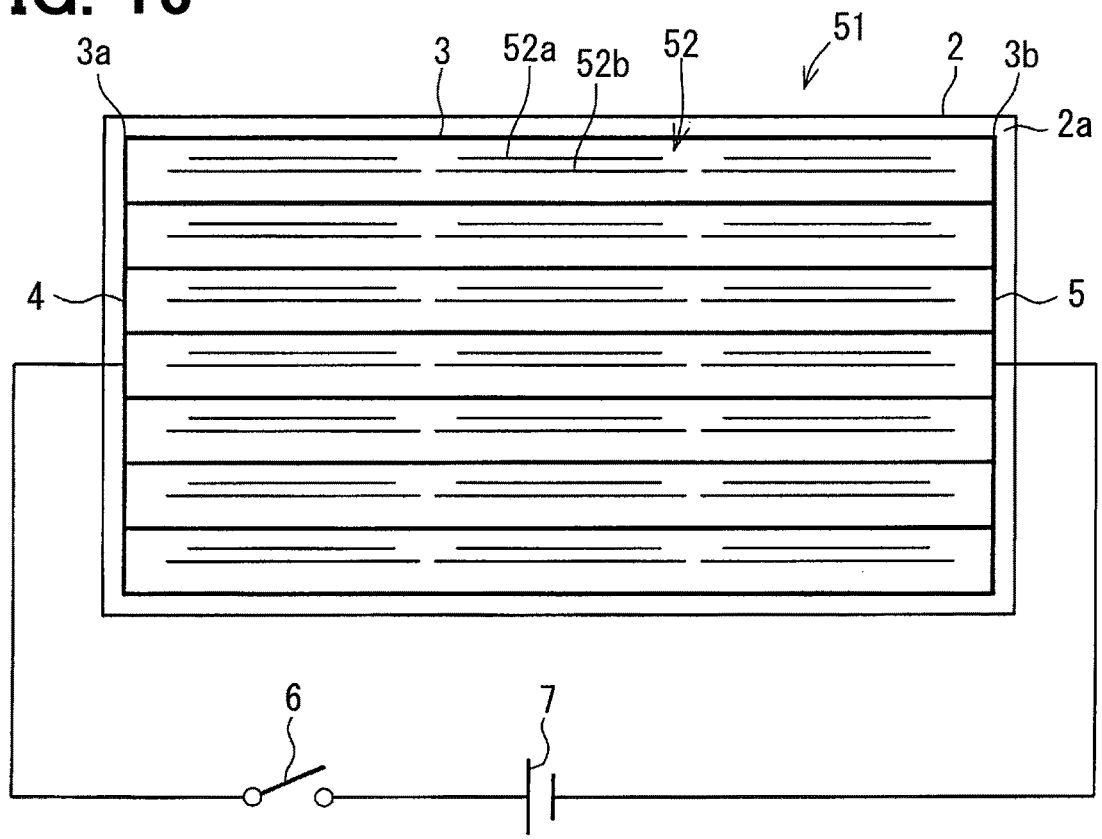
FIG. 16 is a diagram of a second embodiment of the present disclosure, illustrating defogging heat wires and repetitive patterns.
Figure 17:
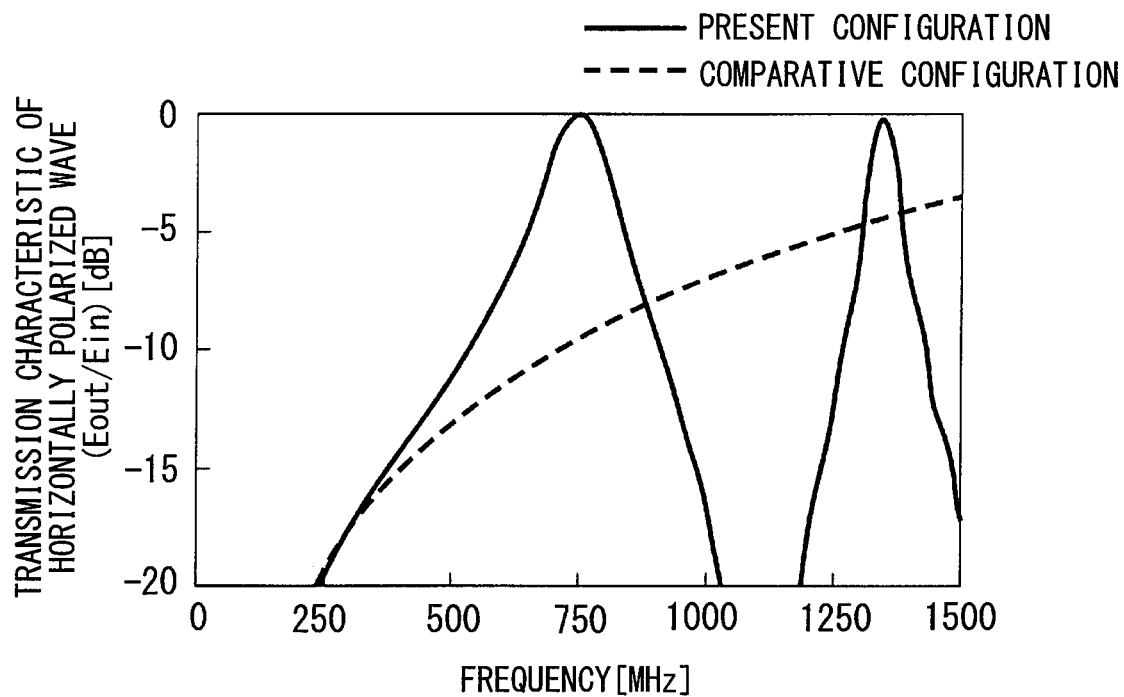
FIG. 17 is a diagram of a transmission characteristic of a horizontally polarized wave.

As illustrated in FIG. 16, repetitive patterns 52 are arranged between defogging heat wires 3 so as to be away from the defogging heat wires 3 on a transparent plate 51. Each of the repetitive patterns 52 includes a plurality (two in FIG. 16) of unit patterns 52a and 52b. The unit patterns 52a and 52b each have a linear shape having a side parallel with the defogging heat wires 3. The unit patterns 52a and 52b have mutually different dimensions. In such a configuration, electrical connection relationships between the defogging heat wires 3 and the unit patterns 52a and between the defogging heat wires 3 and the unit patterns 52b are each equivalent to that between the defogging heat wires 3 and the unit patterns 8a described in the first embodiment, thereby enabling the transparent plate 52 to work as a BPF having mutually different two transmission bands. This results in multiple-frequency transmission bands as illustrated in FIG. 17, thereby enabling increase in gain behind a vehicle in more than one frequency band.

Figure 18:
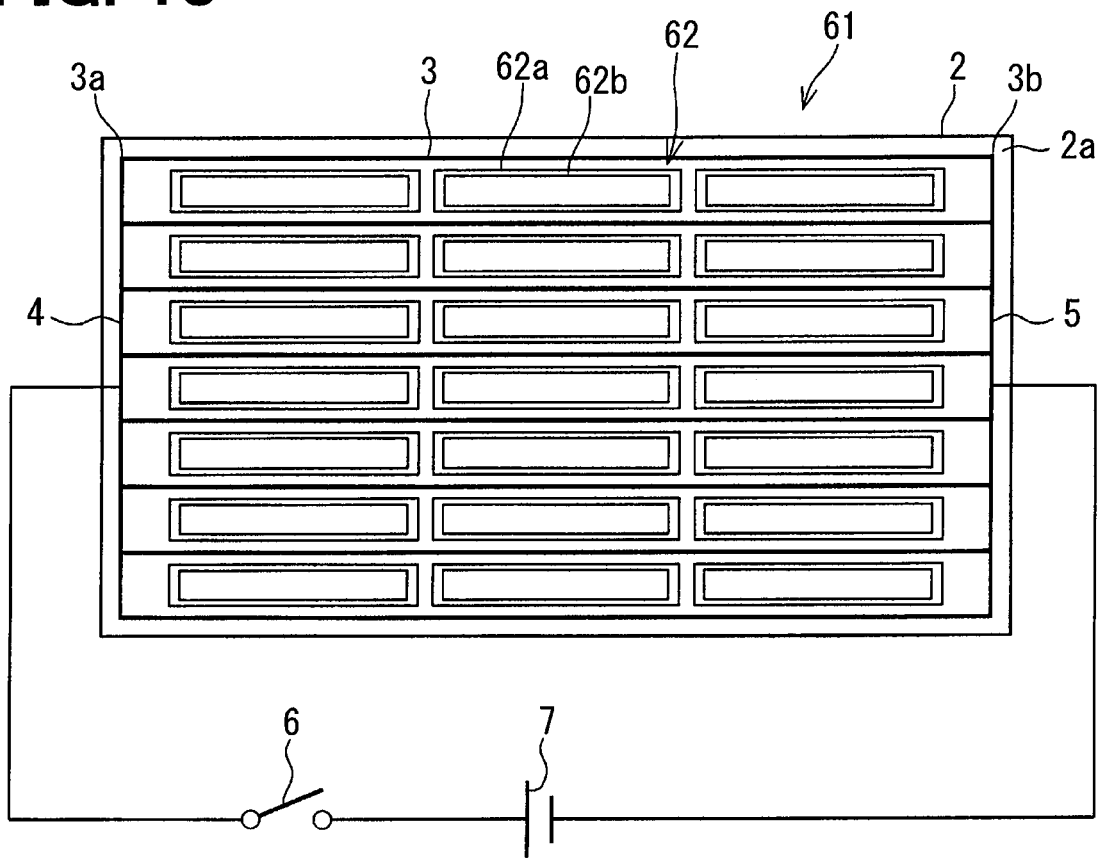
FIG. 18 is a diagram of the defogging heat wires and other repetitive patterns.
Figure 19:
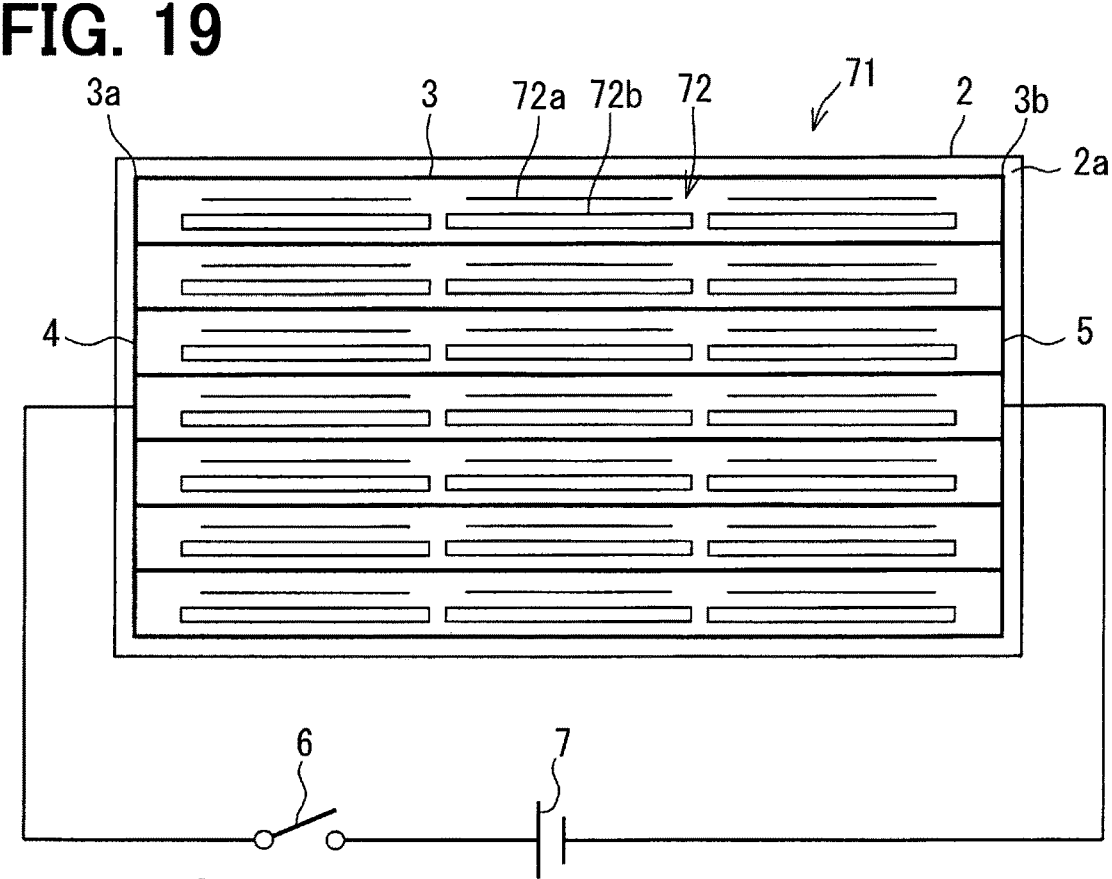
FIG. 19 is a diagram of the defogging heat wires and other repetitive patterns.

In this case also, the shape of the unit pattern that configures the repetitive pattern is not limited to the linear shape described above as an example and may be any other shape. As illustrated in FIG. 18, a repetitive pattern 62 may include a plurality (two in FIG. 18) of unit patterns 62a and 62b on a transparent plate 61. The unit patterns 62a and 62b have loop shapes with mutually different loop lengths and have sides parallel with the defogging heat wires 3. Alternatively, as illustrated in FIG. 19, a repetitive pattern 72 may include a plurality (two in FIG. 19) of unit patterns 72a and 72b on a transparent plate 71. The unit pattern 72a may have a linear shape having a side parallel with the defogging heat wires 3. The unit pattern 72b may have a loop shape having a side parallel with the defogging heat wires 3. In addition to producing operational advantages similar to those of the first embodiment, the second embodiment enables multiple-frequency transmission bands. The number of unit patterns is not limited to two. It may be three or more, so that a transparent plate works as a BPF having three or more transmission bands.

Third Embodiment

A third embodiment of the present disclosure will now be described with reference to FIGS. 20 and 21. The description of components identical with those in the first embodiment described above will be omitted, and different components will be described. While the horizontal gaps between the repetitive patterns 8 are identical in the first embodiment, horizontal gaps between repetitive patterns differ gradually in the vertical direction in the third embodiment.

Figure 20:
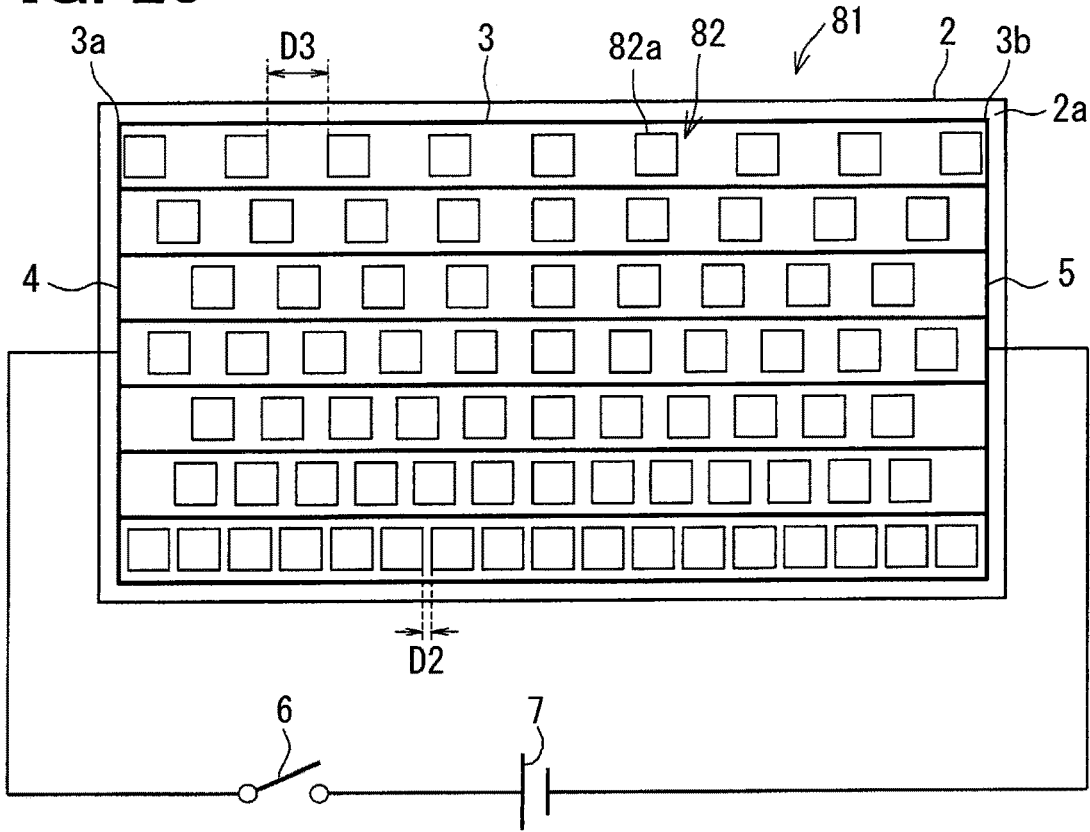
FIG. 20 is a diagram of a third embodiment of the present disclosure, illustrating defogging heat wires and repetitive patterns.
Figure 21:
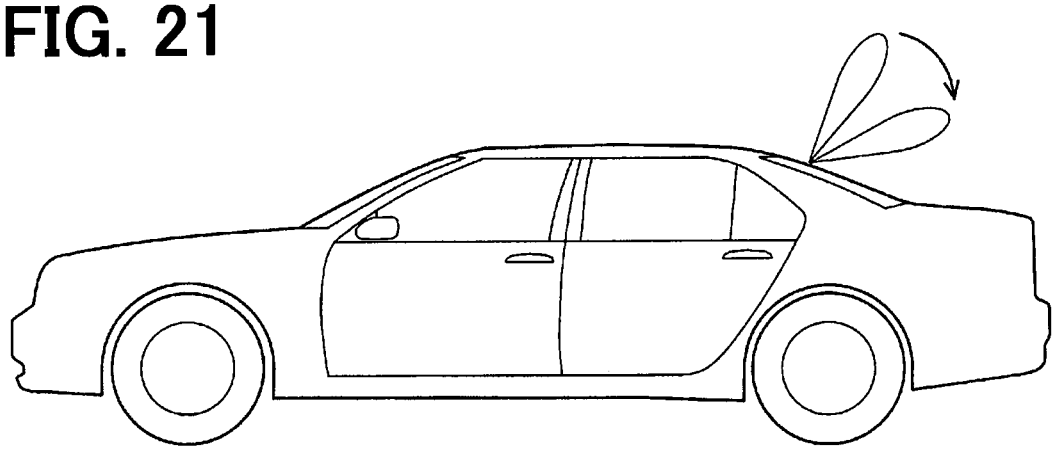
FIG. 21 is a diagram of the direction of a beam of horizontally polarized wave.

As illustrated in FIG. 20, repetitive patterns 82 are arranged between defogging heat wires 3 so as to be away from the defogging heat wires 3 on a transparent plate 81. Each of the repetitive patterns 82 includes one unit pattern 82a. Each of the unit patterns 82a has a loop shape having a side parallel with the defogging heat wires 3. Horizontal gaps between the repetitive patterns 82 differ gradually in the vertical direction. Specifically, the gaps (marked with D2 in FIG. 20) between the repetitive patterns 82 in the lowermost position are narrower than the gaps (marked with D3 in FIG. 20) between the repetitive patterns 82 in the uppermost position, with the remaining gaps between the repetitive patterns 82 reduced gradually from the uppermost position toward the lowermost position.

As the horizontal gaps between the repetitive patterns 82 are reduced, the resonance frequency is moved to a higher band and the phase is advanced. That is, in the present configuration, the phase is advanced further in a lower position than that in an upper position on the transparent plate 81; thus, a radio wave is tilted downward on entering the transparent plate 81 and passes therethrough. Hence, as illustrated in FIG. 21, this configuration, when used in a vehicle having a rear window significantly tilted toward the horizontal direction like a sedan, enables a beam of radio waves radiated by a horizontally polarized wave antenna located in the cabin to tilt toward the horizontal direction (toward a base station), thereby enhancing the sensitivity in the horizontal direction. In addition to producing operational advantages similar to those of the first embodiment, the third embodiment enables enhancement in sensitivity in the horizontal direction. The shape of the unit pattern 82a is not limited to the loop shape and may be a linear shape or a planar shape.

Fourth Embodiment

A fourth embodiment of the present disclosure will now be described with reference to FIG. 22. The description of components identical with those in the third embodiment described above will be omitted, and different components will be described. While the horizontal gaps between the repetitive patterns 82 differ gradually in the vertical direction in the third embodiment, horizontal dimensions of repetitive patterns differ gradually in the vertical direction in the fourth embodiment.

Figure 22:
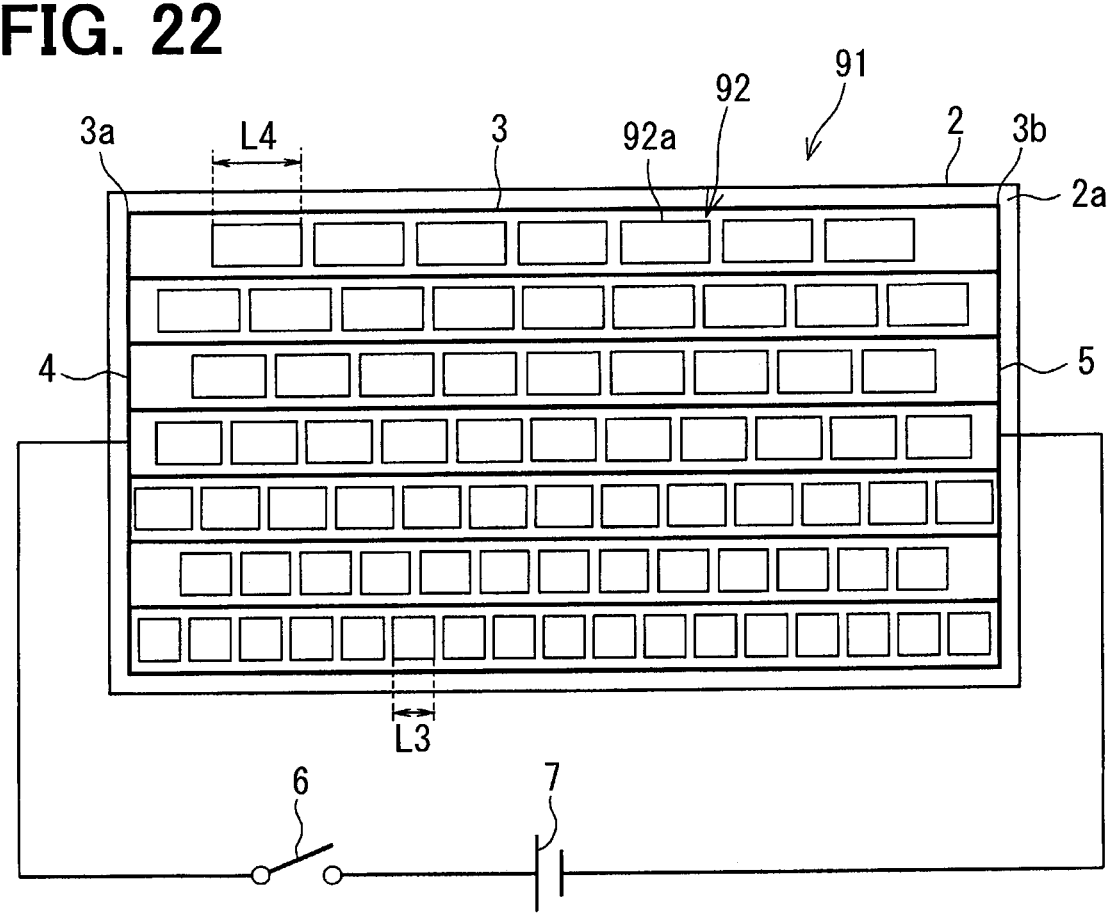
FIG. 22 is a diagram of a fourth embodiment of the present disclosure, illustrating defogging heat wires and repetitive patterns.

As illustrated in FIG. 22, repetitive patterns 92 are arranged between defogging heat wires 3 so as to be away from the defogging heat wires 3 on a transparent plate 91. Each of the repetitive patterns 92 includes one unit pattern 92a. Each of the unit patterns 92a has a loop shape having a side parallel with the defogging heat wires 3. The unit patterns 92a have horizontal dimensions that differ gradually in the vertical direction. Specifically, the horizontal dimensions (marked with L3 in FIG. 22) of the repetitive patterns 92 in the lowermost position are narrower than the dimensions (L4) of the repetitive patterns 92 in the uppermost position, with the remaining horizontal dimensions of the repetitive patterns 9 reduced gradually from the uppermost position toward the lowermost position.

As the horizontal dimensions of the repetitive patterns 92 are reduced, the resonance frequency is moved to a higher band and the phase is advanced, as in the third embodiment. That is, in the present configuration also, the phase is advanced further in a lower position than that in an upper position on the transparent plate 91; thus, a radio wave is tilted downward on entering the transparent plate 91 and passes therethrough. The fourth embodiment can produce operational advantages similar to those of the third embodiment. The shape of the unit pattern 92a is not limited to the loop shape and may be a linear shape or a planar shape.

Fifth Embodiment

A fifth embodiment of the present disclosure will now be described with reference to FIGS. 23 to 25. The description of components identical with those in the first embodiment described above will be omitted, and different components will be described. While the repetitive patterns 8 are arranged on an identical surface on which the defogging heat wires 3 are arranged in the first embodiment, repetitive patterns are arranged on a different surface from that on which defogging heat wires 3 are arranged in the fifth embodiment.

Figure 23:
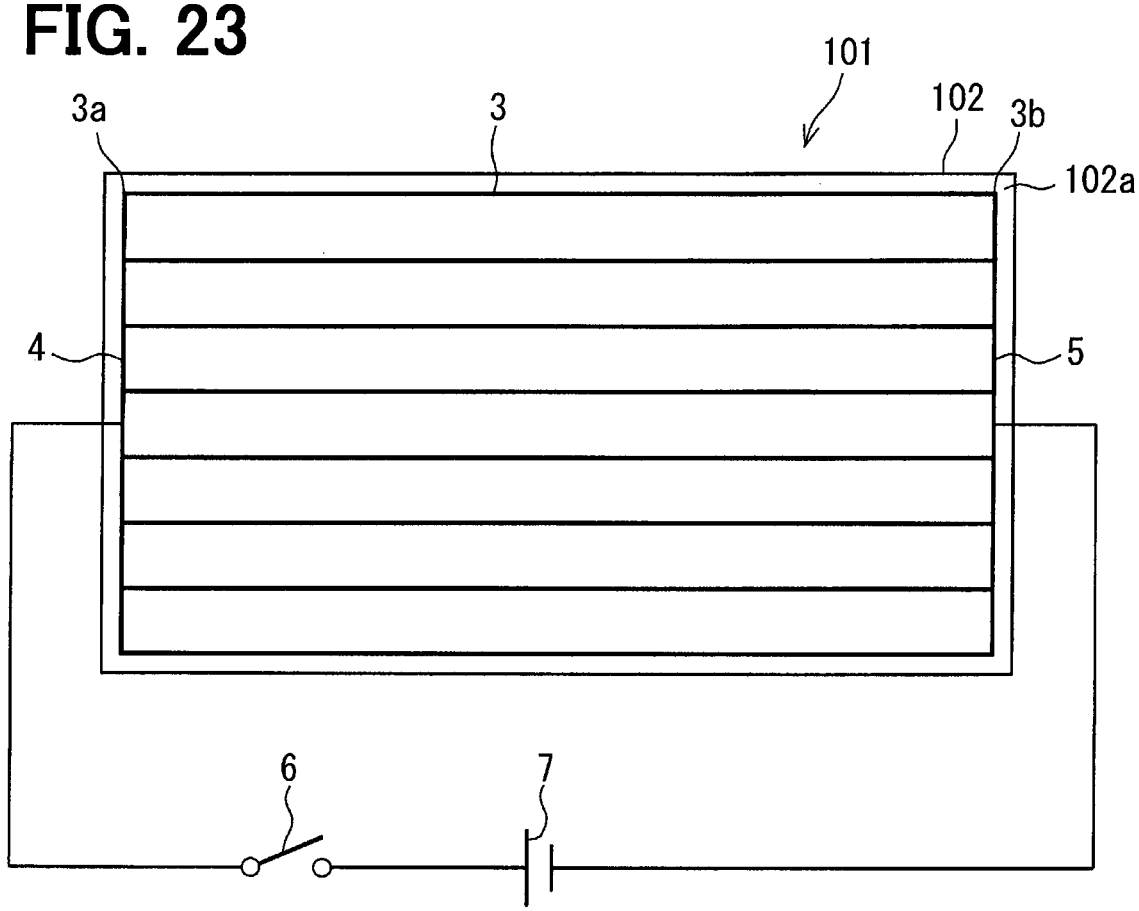
FIG. 23 is a diagram of a fifth embodiment of the present disclosure, illustrating defogging heat wires.
Figure 24:
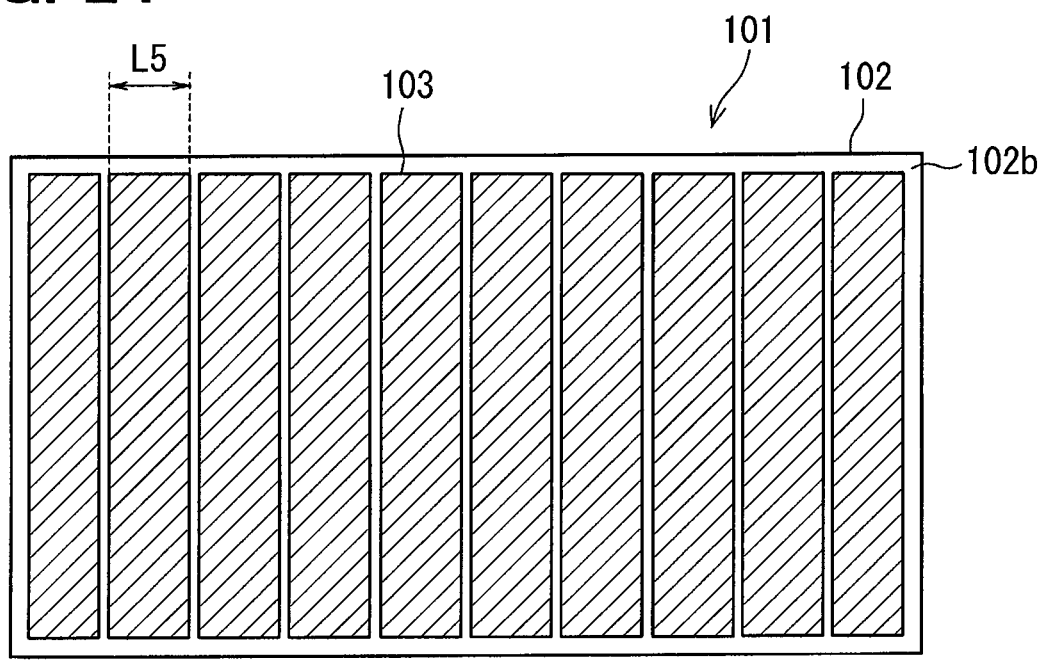
FIG. 24 is a diagram of repetitive patterns.
Figure 25:
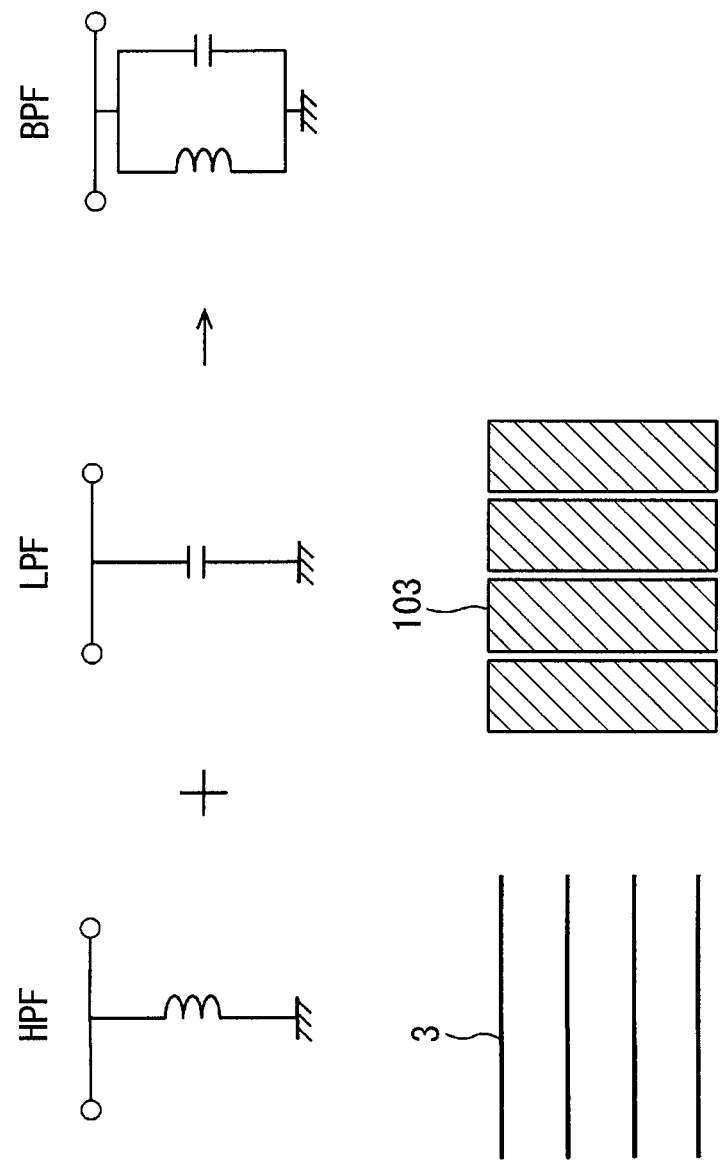
FIG. 25 is a diagram of a relationship of equivalent circuits.

As illustrated in FIGS. 23 and 24, a transparent plate 101 includes a substrate 102, which is made using transparent glass and has a plate-like shape. The substrate 102 has surfaces one of which is a front surface 102a. The defogging heat wires 3 are arranged throughout the front surface 102a thereon in parallel with each other in the horizontal direction. Another surface of the substrate 102 is a back surface 102b. Repetitive patterns 103 are arranged throughout the back surface 102b thereon. The repetitive patterns 103 (indicated as hatched areas in FIGS. 24 and 25) are arranged repetitively (ten in FIG. 24) in the horizontal direction. Each of the repetitive patterns 103 has a planar shape having a side parallel with the vertical direction. The repetitive patterns 103 have a horizontal dimension (marked with L5 in FIG. 24) having a value identical with that of the gaps (L1) between the defogging heat wires. Such a configuration in which the repetitive patterns 103 are arranged throughout a surface is equivalent to that in which a thin layer having vertical slits therein is formed throughout a surface. The repetitive patterns 103 are also desirably made using a transparent or translucent material to maintain the visibility.

In a configuration as described above, since the defogging heat wires 3 are arranged in parallel with each other in the horizontal direction on the front surface 102a of the substrate 102, the transparent plate 101 works as an HPF due to its frequency selective surface, as described above in the first embodiment. Additionally, since the repetitive patterns 103 are arranged in the horizontal direction on the back surface 102b of the substrate 102, the transparent plate 101 works as an LPF due to its frequency selective surface. That is, the electrical connection between the defogging heat wires 3 and the repetitive patterns 103 is equated with a parallel connection between an inductive component and a capacitive component, and thereby the transparent plate 101 works as a BPF due to its frequency selective surface. In other words, as illustrated in FIG. 25, the present embodiment combines the defogging heat wires 3, which work as an HPF alone, and the repetitive patterns 103, which work as an LPF alone, to form a metamaterial configuration, enabling the metamaterial configuration to work as a BPF and thereby improving the transmission characteristic of a horizontally polarized wave.

As described above, the fifth embodiment can produce operational advantages described below. The transparent plate 101 including the defogging heat wires 3 on the front surface 102a includes the repetitive patterns 103 on the back surface 102b. The electrical connection between the defogging heat wires 3 and the repetitive patterns 103 is equated with a parallel connection between an inductive component and a capacitive component, and thereby the transparent plate 101 works as a BPF due to its frequency selective surface. Additionally, the placement of the defogging heat wires 3 on the front surface 102a and the repetitive patterns 103 on the back surface 102b prohibits the repetitive patterns 103 from coming into contact with the defogging heat wires 3 and thereby prevents impairment of the defogging function of the defogging heat wires 3. In this manner, operational advantages similar to those of the first embodiment can be produced.

Sixth Embodiment

Figure 27:
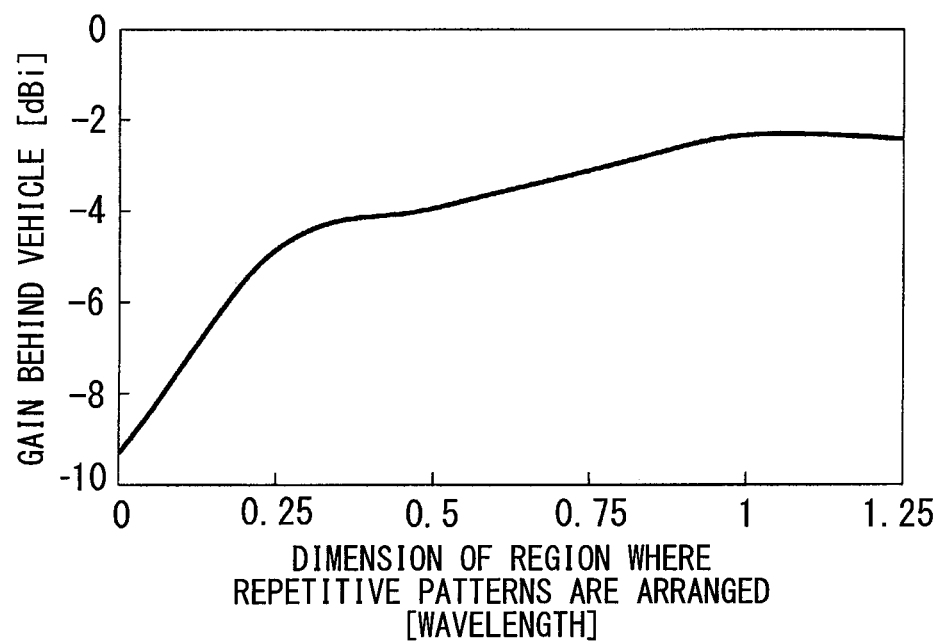
FIG. 27 is a diagram for describing a relationship between a gain behind a vehicle and a dimension of a region in which the repetitive patterns are arranged.
Figure 28:
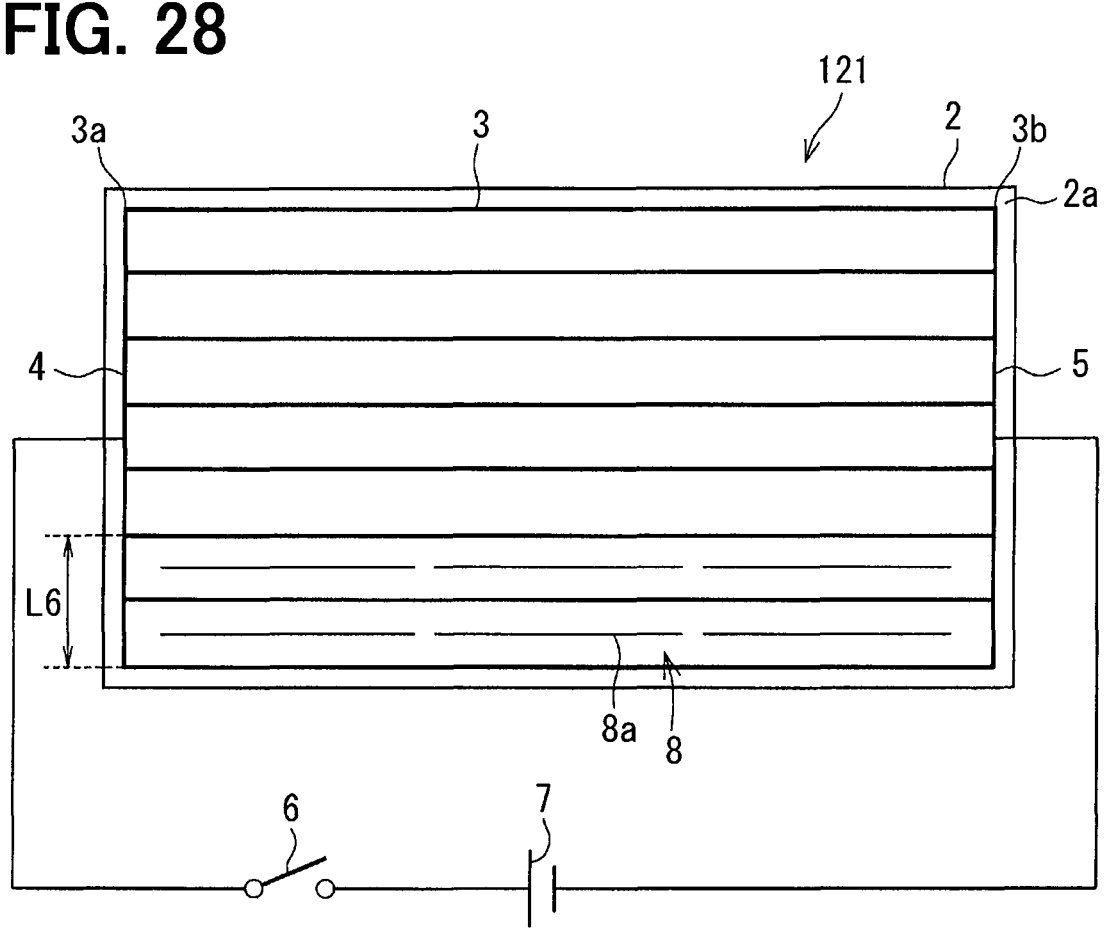
FIG. 28 is a diagram of the defogging heat wires and other repetitive patterns.

A sixth embodiment of the present disclosure will now be described with reference to FIGS. 26 to 28. The description of components identical with those in the first embodiment described above will be omitted, and different components will be described. While the repetitive patterns 8 are arranged throughout the surface in the first embodiment, repetitive patterns 8 are arranged in a portion of a surface in the sixth embodiment.

Figure 26:
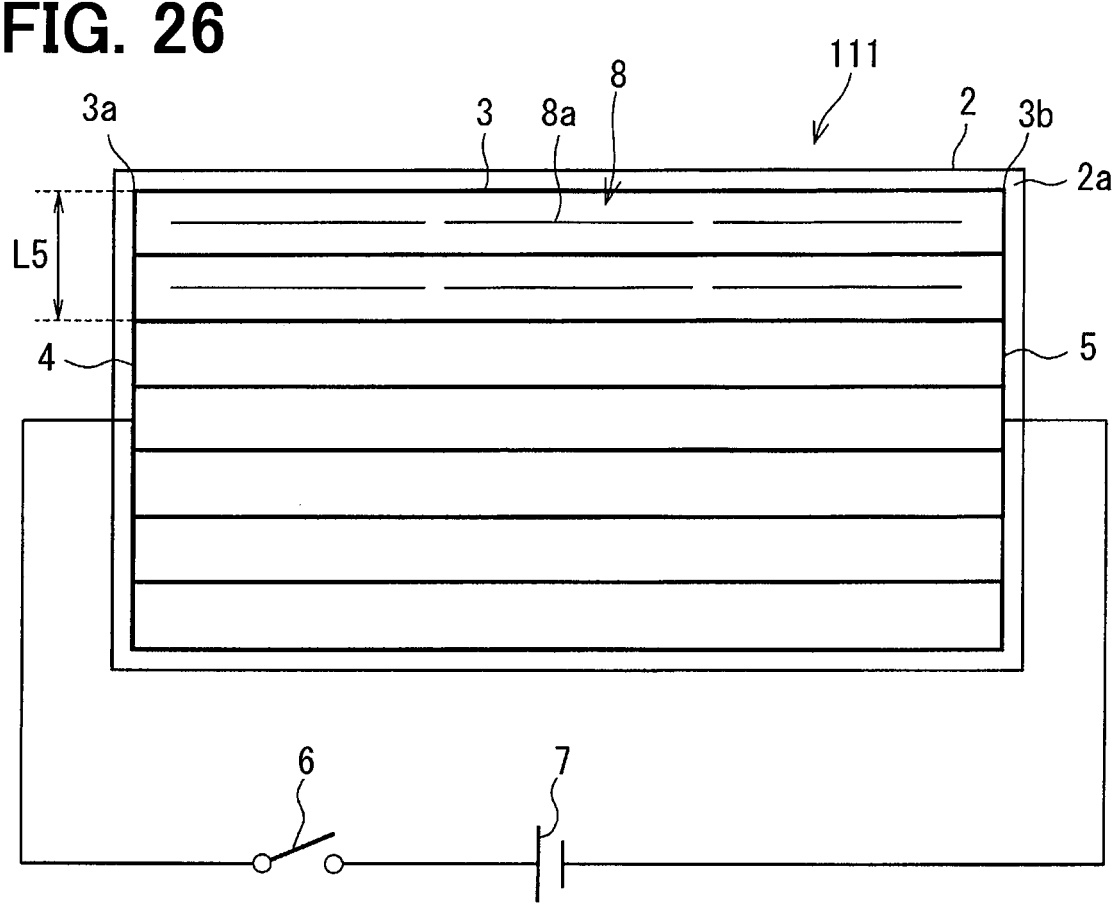
FIG. 26 is a diagram of a sixth embodiment of the present disclosure, illustrating defogging heat wires and repetitive patterns.

When a horizontally polarized wave antenna is located near an upper portion of a transparent plate 111, the repetitive patterns 8 are arranged only in an upper portion of a surface of the transparent plate 111 with no repetitive patterns 8 in a lower portion of the surface as illustrated in FIG. 26. A vertical dimension (marked with L5 in FIG. 26) of a region in which the repetitive patterns 8 are arranged is equal to or greater than a value obtained by multiplying the wavelength of the operating frequency by (¼). FIG. 27 illustrates a relationship between the gain behind a vehicle and the vertical dimension of the region in which the repetitive patterns 8 are arranged. The gain behind the vehicle increases rapidly until the vertical dimension of the region in which the repetitive patterns 8 are arranged reaches a value obtained by multiplying the wavelength of the operating frequency by (¼) and, when the dimension exceeds the value, increases gently. The repetitive patterns 8 do not necessarily need to be arranged throughout the surface; the repetitive patterns 8 may be arranged in a region equal to or greater than a value obtained by multiplying the wavelength of the operating frequency by (¼). Conversely, when a horizontally polarized wave antenna is located near a lower portion of a transparent plate 111, the repetitive patterns 8 may be arranged only in a lower portion of a surface of the transparent plate 121 as illustrated in FIG. 28. In this case also, a vertical dimension (marked with L6 in FIG. 28) of a region in which the repetitive patterns 8 are arranged is equal to or greater than a value obtained by multiplying the wavelength of the operating frequency by (¼). In addition to producing operational advantages similar to those of the first embodiment, the sixth embodiment minimizes the region in which the repetitive patterns 8 are arranged, thereby enabling inhibition of degradation in visibility due to the placement of the repetitive patterns 8.

Other Embodiments

The present disclosure is not limited to the embodiments described above and can be modified or expanded as described below.

While the transparent plate is for use in an automotive rear window in the present embodiments, the transparent plate may be for use in, for example, a window of a building structure.

While the substrate is made using transparent glass in the present embodiments, the substrate may be made using, for example, transparent resin.

While the operating frequency is 750 [MHz], which is used for telephone communication, in the present embodiments, any frequency may be used as the operating frequency. The operating frequency may be, for example, a frequency used for broadcasting, such as FM broadcasting, AM broadcasting, UHF broadcasting, and VHF broadcasting, a frequency used for satellite communication, such as a GPS, and a frequency used for device control, such as keyless entry.

Figure 29:
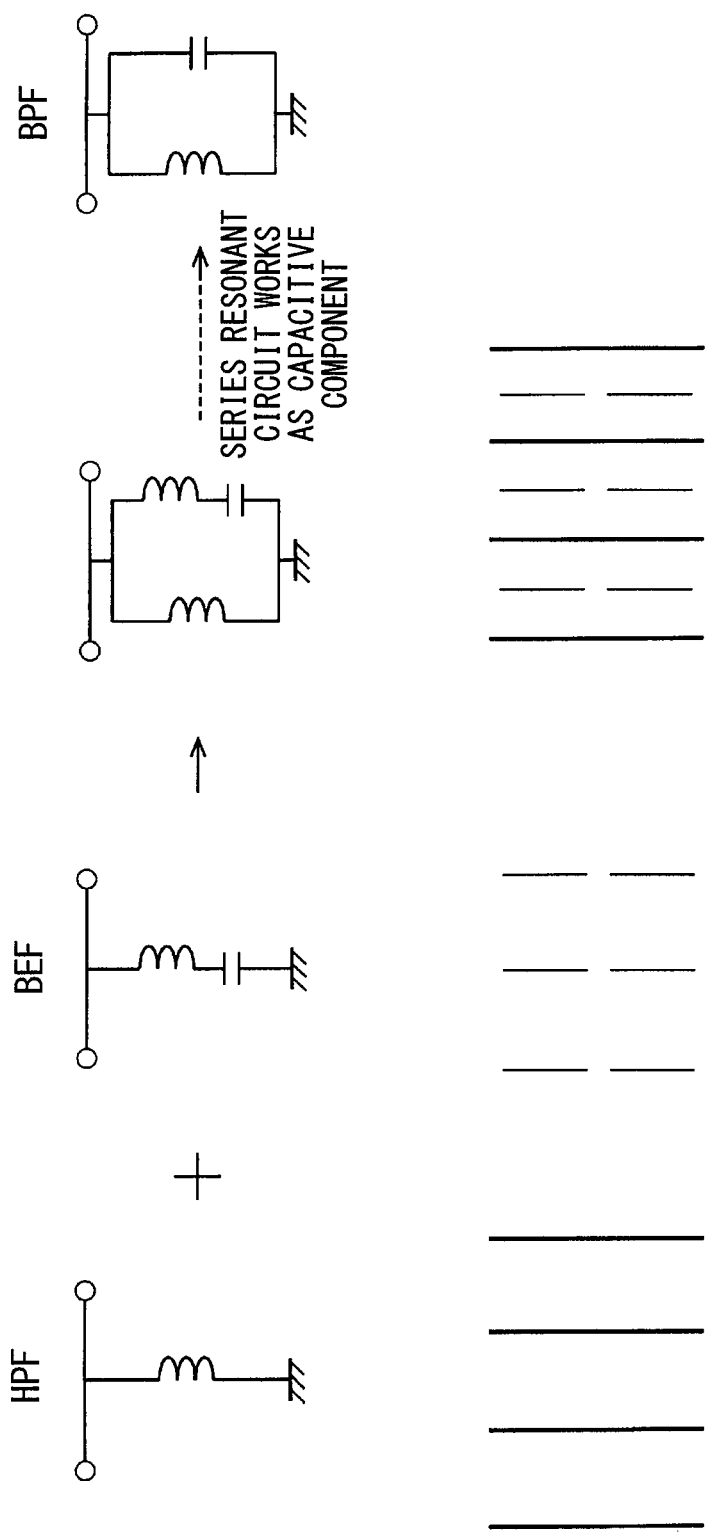
FIG. 29 is a diagram of other embodiments of the present disclosure, illustrating a relationship of equivalent circuits.
Figure 30:
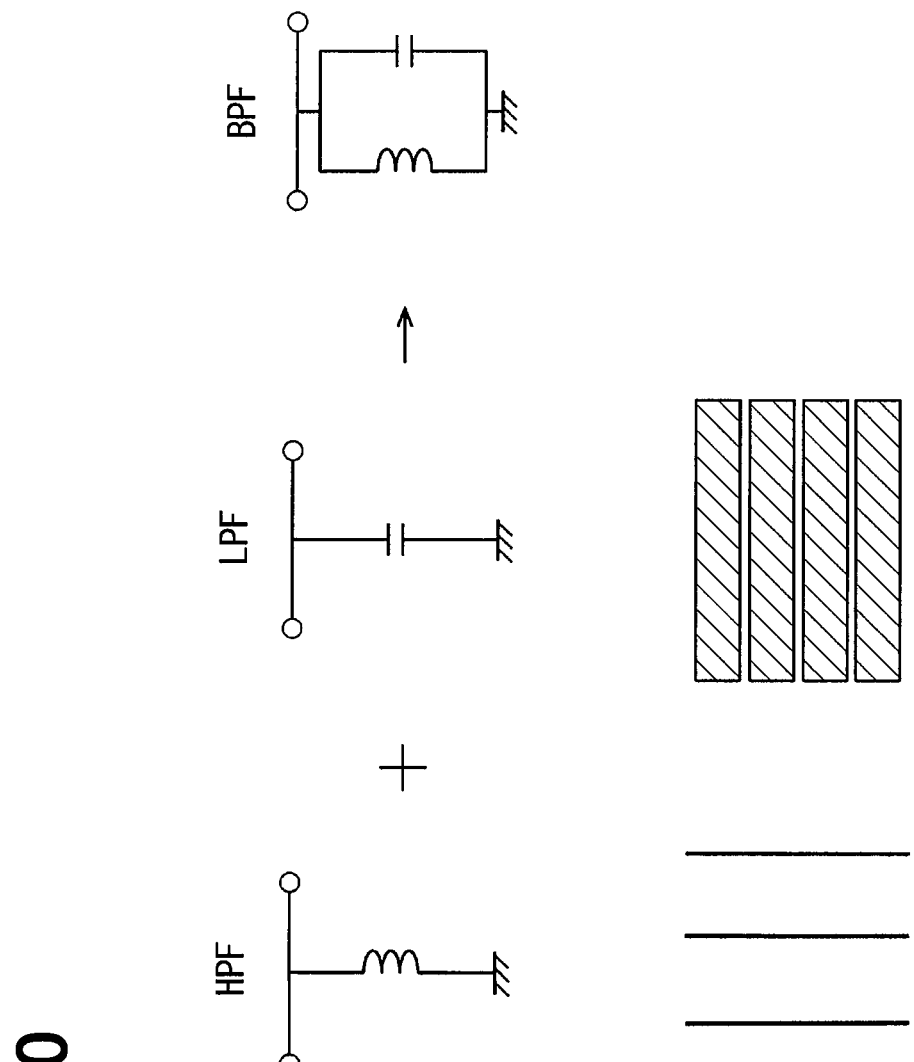
FIG. 30 is a diagram of a relationship of equivalent circuits.
Figure 31:
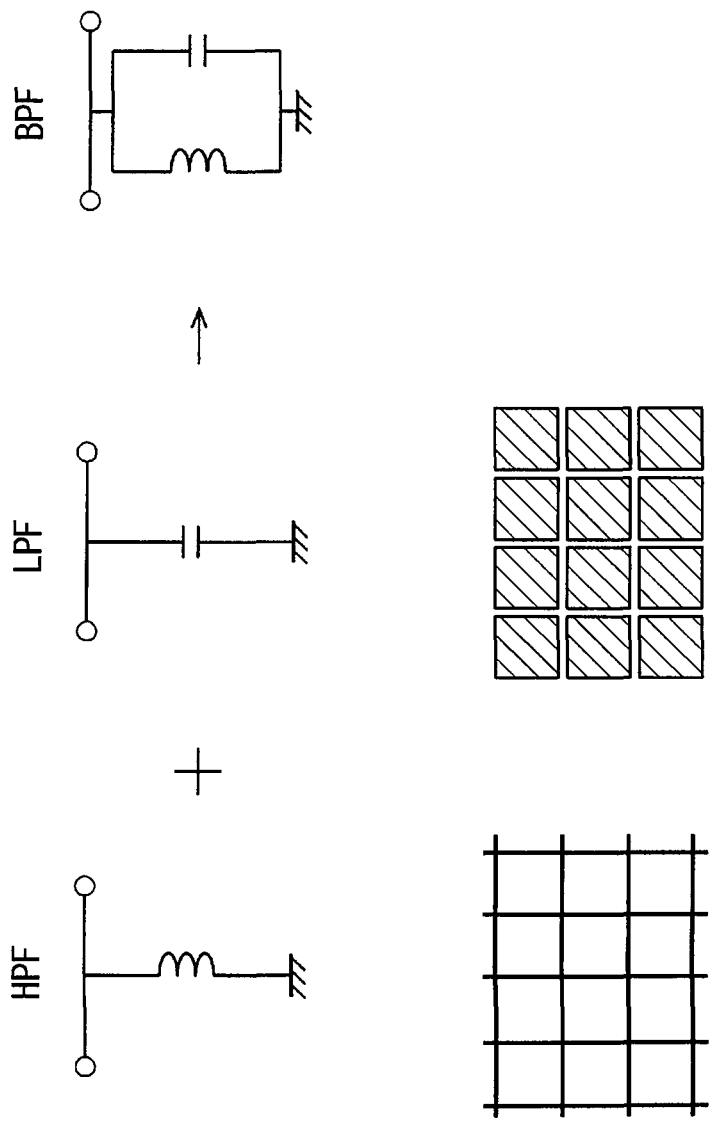
FIG. 31 is a diagram of a relationship of equivalent circuits.

While the transmission characteristic of a horizontally polarized wave is improved when the defogging heat wires are arranged in parallel with each other in the horizontal direction in exemplary configurations described in the present embodiments, the transmission characteristic of a vertically polarized wave may be improved when defogging heat wires are arranged in parallel with each other in the vertical direction. Specifically, in a case in which the principle described in the first embodiment is applied to a vertically polarized wave, the vertical direction is defined as the first predefined direction and the horizontal direction is defined as the second predefined direction to enable improvement in transmission characteristic of the vertically polarized wave based on a principle illustrated in FIG. 29. Additionally, in a case in which the principle described in the fifth embodiment is applied to a vertically polarized wave, the vertical direction is defined as the first predefined direction and the horizontal direction is defined as the second predefined direction to enable improvement in transmission characteristic of the vertically polarized wave based on a principle illustrated in FIG. 30. Furthermore, the transmission characteristics of a horizontally polarized wave and a vertically polarized wave can be both improved as illustrated in FIG. 31 by combining the principle illustrated in FIG. 25 and the principle illustrated in FIG. 30.

Figure 32:
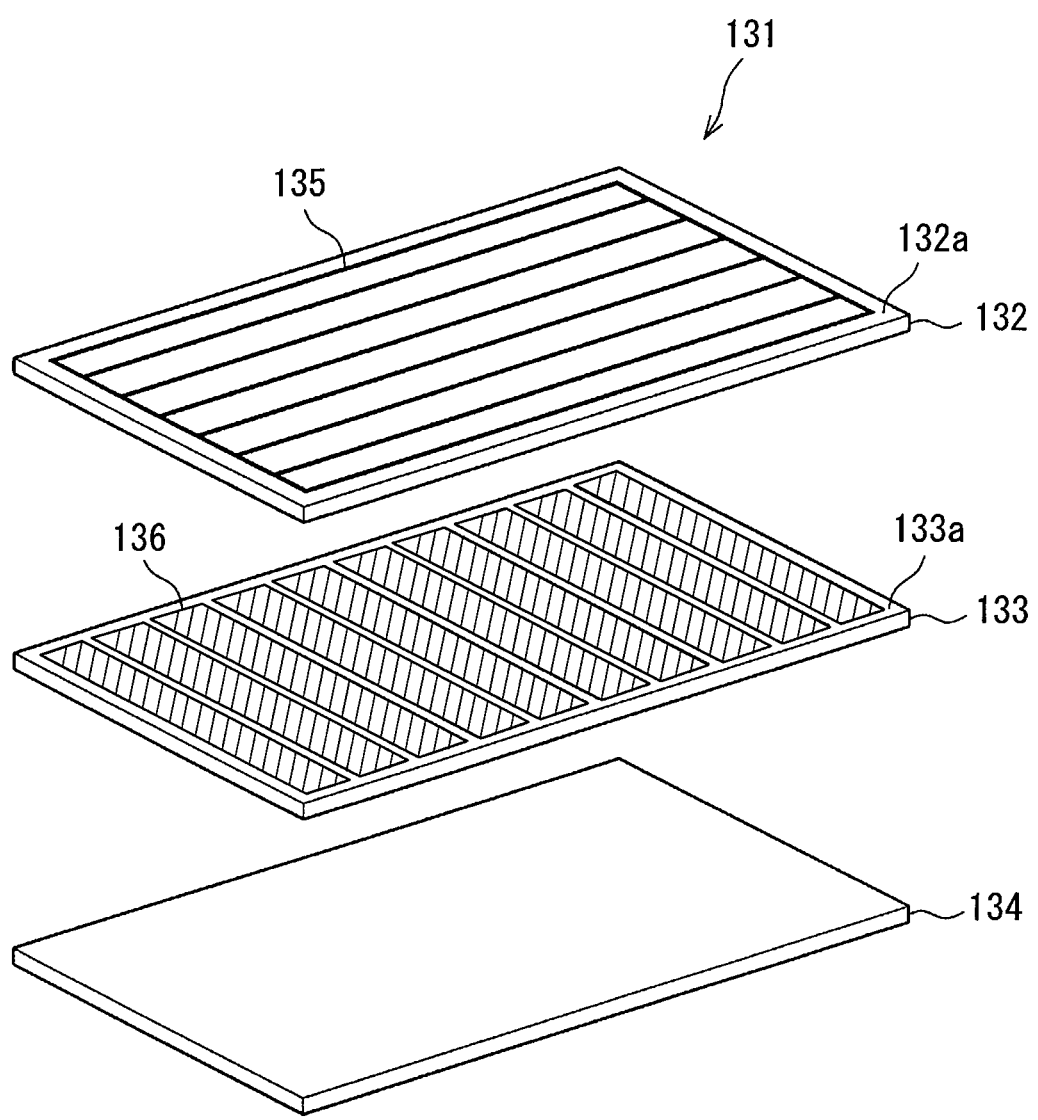
FIG. 32 is a diagram of defogging heat wires and repetitive patterns on a laminated glass.

While the defogging heat wires are arranged on the front surface of a substrate and the repetitive patterns are arranged on the back surface of the substrate in an exemplary configuration described in the fifth embodiment, the defogging heat wires and the repetitive patterns only need to be arranged on mutually different surfaces. As illustrated in FIG. 32, when a transparent plate 131 is configured using laminated glass formed by surface adhesion of three substrates 132 to 134 each made using transparent glass, defogging heat wires 135, which are equivalent to the defogging heat wires 3, may be arranged on, for example, a front surface 132a of the substrate 132, which is a front layer, and repetitive patterns 136, which are equivalent to the repetitive patterns 103, may be arranged on a front surface 133a of the substrate 133, which is an intermediate layer. That is, the repetitive patterns 136 (indicated as hatched areas in FIG. 32) may be embedded in the transparent plate 131. In such a configuration, the electrical connection between the defogging heat wires 135 and the repetitive patterns 136 is equated with a parallel connection between an inductive component and a capacitive component, and thereby the transparent plate 131 works as a BPF due to its frequency selective surface. In this manner, operational advantages similar to those in the first embodiment can be produced.

Some of the first to sixth embodiments may be combined. For example, the second and third embodiments may be combined together, so that a repetitive pattern includes a plurality of unit patterns and that horizontal gaps between the unit patterns differ gradually in the vertical direction. Additionally, for example, the second and fourth embodiments may be combined together, so that a repetitive pattern includes a plurality of unit patterns and that horizontal dimensions of the unit patterns differ gradually in the vertical direction. Such configurations enable multiple-frequency transmission bands and enhance the sensitivity in the horizontal direction.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A transparent window plate provided with a plurality of defogging heat wires, each of the plurality of defogging heat wires arranged to have a side parallel with a first direction, the plate comprising:

a plurality of repetitive patterns that are arranged between one of the plurality of defogging heat wires and an adjacent one of the plurality of defogging heat wires so as to be not in contact with the plurality of defogging heat wires, and each of the plurality of repetitive patterns having at least one side parallel with the plurality of defogging heat wires, wherein:

the plurality of repetitive patterns are aligned along the first direction;

the plurality of repetitive patterns are repetitively arranged along a second direction perpendicular to the first direction;

each of the repetitive patterns includes a plurality of unit patterns; and the plurality of unit patterns respectively have sides parallel with each other, and the sides are mutually different in dimension in the first direction.

2. The transparent window plate provided with defogging heat wires according to claim 1, wherein:

each of the repetitive patterns has one unit pattern or a plurality of unit patterns; and the one unit pattern or each of the unit patterns has a linear shape.

3. The transparent window plate provided with defogging heat wires according to claim 1, wherein:

each of the repetitive patterns has one unit pattern; and the unit pattern has a planar shape.

4. The transparent window plate provided with defogging heat wires according to claim 1, wherein:

each of the repetitive patterns has one unit pattern or a plurality of unit patterns; and the one unit pattern or each of the unit patterns has a loop shape.

5. The transparent window plate provided with defogging heat wires according to claim 1, wherein:

each of the repetitive patterns has a plurality of unit patterns; and the plurality of unit patterns include a linear shape and a loop shape.

6. A transparent window plate provided with a plurality of defogging heat wires, each of the plurality of defogging heat wires arranged to have a side parallel with a first direction, the plate comprising:

a plurality of repetitive patterns that are arranged between one of the plurality of defogging heat wires and an adjacent one of the plurality of defogging heat wires so as to be not in contact with the plurality of defogging heat wires, and each of the plurality of repetitive patterns having at least one side parallel with the plurality of defogging heat wires, wherein:

the plurality of repetitive patterns are aligned along the first direction;

the plurality of repetitive patterns are repetitively arranged along a second direction perpendicular to the first direction; and a gap in the first direction between one of the plurality of repetitive patterns and an adjacent one of the plurality of repetitive patterns differs stepwise along the second direction.

7. The transparent window plate provided with defogging heat wires according to claim 6, wherein each of the repetitive patterns includes one unit pattern.

8. A transparent window plate provided with a plurality of defogging heat wires, each of the plurality of defogging heat wires arranged to have a side parallel with a first direction, the plate comprising:

a plurality of repetitive patterns that are arranged between one of the plurality of defogging heat wires and an adjacent one of the plurality of defogging heat wires so as to be not in contact with the plurality of defogging heat wires, and each of the plurality of repetitive patterns having at least one side parallel with the plurality of defogging heat wires, wherein:

the plurality of repetitive patterns are aligned along the first direction;

the plurality of repetitive patterns are repetitively arranged along a second direction perpendicular to the first direction; and dimensions of the plurality of repetitive patterns in the first direction are different stepwise along the second direction.

9. The transparent window plate provided with defogging heat wires according to claim 8, wherein each of the repetitive patterns includes one unit pattern.

10. A transparent window plate provided with a plurality of defogging heat wires, each of the plurality of defogging heat wires arranged to have a side parallel with a first direction, the plate comprising:

a plurality of repetitive patterns arranged on a surface, which is different from a surface on which the defogging heat wires are arranged, each of the plurality of repetitive patterns having at least one side parallel with a second predefined direction, which is perpendicular to the first direction, the each of the plurality of repetitive patterns having a dimension in the first direction identical to a gap between one of the plurality of defogging heat wires and an adjacent one of the plurality of defogging heat wires, wherein the plurality of repetitive patterns are arranged repetitively in the first direction.

11. The transparent window plate provided with defogging heat wires according to claim 10, wherein a dimension, in the second direction, of a region in which the repetitive patterns are arranged has a value equal to or greater than a quarter of a wavelength of an operating frequency.

12. The transparent window plate provided with defogging heat wires according to claim 10, wherein the plurality of repetitive patterns are configured using a transparent or translucent material.

\* \* \* \* \*